United States Patent
Nichols et al.

(10) Patent No.: US 8,886,520 B1
(45) Date of Patent: *Nov. 11, 2014

(54) METHOD AND APPARATUS FOR TRIGGERING THE AUTOMATIC GENERATION OF NARRATIVES

(75) Inventors: Nathan Nichols, Chicago, IL (US); Michael Justin Smathers, Chicago, IL (US); Lawrence Birnbaum, Evanston, IL (US); Kristian Hammond, Chicago, IL (US); Lawrence E. Adams, Chicago, IL (US)

(73) Assignee: Narrative Science Inc., Chicago, IL (US)

( * ) Notice: Subject to any disclaimer, the term of this patent is extended or adjusted under 35 U.S.C. 154(b) by 590 days.

This patent is subject to a terminal disclaimer.

(21) Appl. No.: 13/186,337

(22) Filed: Jul. 19, 2011

Related U.S. Application Data

(63) Continuation-in-part of application No. 12/986,996, filed on Jan. 7, 2011, now abandoned, and a continuation-in-part of application No. 12/986,981, filed on Jan. 7, 2011, now abandoned, and a continuation-in-part of application No. 12/986,972, filed on Jan. 7, 2011, now abandoned.

(51) Int. Cl.
*G06F 17/20* (2006.01)
*G06F 17/27* (2006.01)
*G06N 5/02* (2006.01)

(52) U.S. Cl.
USPC ........................................ 704/9; 704/1; 706/46

(58) Field of Classification Search
CPC .......... G06F 17/27; G06F 17/729; G06N 5/00
USPC ......... 704/1, 9; 706/45, 46, 48, 50, 55, 59–61
See application file for complete search history.

(56) References Cited

U.S. PATENT DOCUMENTS

| | | | |
|---|---|---|---|
| 4,992,939 A | 2/1991 | Tyler | |
| 5,734,916 A | 3/1998 | Greenfield et al. | |
| 5,802,495 A | 9/1998 | Goltra | |
| 6,289,363 B1 | 9/2001 | Consolatti et al. | |
| 6,976,031 B1 | 12/2005 | Toupal et al. | |
| 7,246,315 B1 | 7/2007 | Andrieu et al. | |
| 7,333,967 B1 | 2/2008 | Bringsjord et al. | |
| 7,577,634 B2 | 8/2009 | Ryan et al. | |
| 7,610,279 B2 | 10/2009 | Budzik et al. | |
| 7,617,199 B2 | 11/2009 | Budzik et al. | |
| 7,617,200 B2 | 11/2009 | Budzik et al. | |
| 7,627,565 B2 | 12/2009 | Budzik et al. | |
| 7,644,072 B2 | 1/2010 | Budzik et al. | |

(Continued)

OTHER PUBLICATIONS

Andersen, P., Hayes, P., Huettner, A., Schmandt, L., Nirenburg, I., and Weinstein, S. (1992). Automatic extraction of facts from press releases to generate news stories. In Proceedings of the third conference on Applied natural language processing. (Trento, Italy). ACM Press, New York, NY, 170-177.

(Continued)

*Primary Examiner* — Angela A Armstrong
(74) *Attorney, Agent, or Firm* — Thompson Coburn LLP

(57) ABSTRACT

Artificial intelligence methods and systems for triggering the generation of narratives are disclosed. Specific embodiments relate to real-time evaluation and automated generation of narrative stories based on received data. For example, data can be tested against data representative of a plurality of story angles to determine whether a narrative story incorporating one or more such story angles is to be automatically generated.

42 Claims, 22 Drawing Sheets

(56) References Cited

U.S. PATENT DOCUMENTS

| | | | |
|---|---|---|---|
| 7,657,518 | B2 | 2/2010 | Budzik et al. |
| 7,836,010 | B2 | 11/2010 | Hammond et al. |
| 7,856,390 | B2 | 12/2010 | Schiller |
| 8,046,226 | B2 | 10/2011 | Soble et al. |
| 8,355,903 | B1 | 1/2013 | Birnbaum et al. |
| 8,374,848 | B1 | 2/2013 | Birnbaum et al. |
| 8,515,737 | B2 | 8/2013 | Allen |
| 8,630,844 | B1 | 1/2014 | Nichols et al. |
| 8,688,434 | B1 | 4/2014 | Birbaum et al. |
| 8,775,161 | B1 | 7/2014 | Nichols et al. |
| 2002/0083025 | A1 | 6/2002 | Robarts et al. |
| 2004/0138899 | A1 | 7/2004 | Birnbaum et al. |
| 2004/0255232 | A1 | 12/2004 | Hammond et al. |
| 2005/0027704 | A1 | 2/2005 | Hammond et al. |
| 2005/0028156 | A1 | 2/2005 | Hammond et al. |
| 2006/0031182 | A1 | 2/2006 | Ryan et al. |
| 2006/0212446 | A1 | 9/2006 | Hammond et al. |
| 2006/0271535 | A1 | 11/2006 | Hammond et al. |
| 2006/0277168 | A1 | 12/2006 | Hammond et al. |
| 2007/0132767 | A1 | 6/2007 | Wright et al. |
| 2007/0185846 | A1 | 8/2007 | Budzik et al. |
| 2007/0185847 | A1 | 8/2007 | Budzik et al. |
| 2007/0185861 | A1 | 8/2007 | Budzik et al. |
| 2007/0185862 | A1 | 8/2007 | Budzik et al. |
| 2007/0185863 | A1 | 8/2007 | Budzik et al. |
| 2007/0185864 | A1 | 8/2007 | Budzik et al. |
| 2007/0185865 | A1 | 8/2007 | Budzik et al. |
| 2008/0313130 | A1 | 12/2008 | Hammond et al. |
| 2009/0019013 | A1 | 1/2009 | Tareen et al. |
| 2009/0030899 | A1 | 1/2009 | Tareen et al. |
| 2009/0049041 | A1 | 2/2009 | Tareen et al. |
| 2009/0144608 | A1 | 6/2009 | Oisel et al. |

OTHER PUBLICATIONS

Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI), Munich.
Asset Economics, Inc. (Feb. 11, 2011).
Bailey, P. (1999). Searching for Storiness: Story-Generation from a Reader's Perspective. AAAI Technical Report FS-99-01.
Bethem, T., Burton, J., Caldwell, T., Evans, M., Kittredge, R., Lavoie, B., and Werner, J. (2005). Generation of Real-time Narrative Summaries for Real-time Water Levels and Meteorological Observations in PORTS®. In Proceedings of the Fourth Conference on Artificial Intelligence Applications to Environmental Sciences (AMS-2005), San Diego, California.
Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.
Boyd, S. (1998). Trend: a system for generating intelligent descriptions of time series data. Paper presented at Proceedings of the IEEE international conference on intelligent processing systems (ICIPS-1998).
Dehn, N. (1981). Story generation after Tale-Spin. In Proceedings of the Seventh International Joint Conference on Artificial Intelligence. (Vancouver, Canada).
Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22, pp. 153-186.
Gatt, A., and Portet, F. (2009). Text content and task performance in the evaluation of a Natural Language Generation System. Proceedings of the Conference on Recent Advances in Natural Language Processing (RANLP-09).
Glahn, H. (1970). Computer-produced worded forecasts. Bulletin of the American Meteorological Society, 51(12), 1126-1131.
Goldberg, E., Driedger, N., & Kittredge, R. (1994). Using Natural-Language Processing to Produce Weather Forecasts. IEEE Expert, 9 (2), 45.
Hargood, C., Millard, D. and Weal, M. (2009). Investigating a Thematic Approach to Narrative Generation, 2009.
Hargood, C., Millard, D. and Weal, M. (2009) Exploring the Importance of Themes in Narrative Systems.
Hunter, J., Gatt, A., Portet, F., Reiter, E., and Sripada, S. (2008). Using natural language generation technology to improve information flows in intensive care units. Proceedings of the 5th Conference on Prestigious Applications of Intelligent Systems, PAIS-08.
Hunter, J., Freer, Y., Gatt, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedings, pp. 323-327.
Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.
Kittredge, R., and Lavoie, B. (1998). MeteoCogent: A Knowledge-Based Tool for Generating Weather Forecast Texts. In Proceedings of the American Meteorological Society AI Conference (AMS-98), Phoenix, Arizona.
Kukich, K. (1983). Design of a Knowledge-Based Report Generator. Proceedings of the 21st Conference of the Association for Computational Linguistics, Cambridge, MA, pp. 145-150.
Kukich, K. (1983). Knowledge-Based Report Generation: A Technique for Automatically Generating Natural Language Reports from Databases. Paper presented at Proceedings of the Sixth International ACM SIGIR Conference, Washington, DC.
McKeown, K., Kukich, K., & Shaw, J. (1994). Practical issues in automatic documentation generation. 4th Conference on Applied Natural Language Processing, Stuttgart, Germany, pp. 7-14.
Meehan, James R., Tale-Spin. (1977). An Interactive Program that Writes Stories. In Proceedings of the Fifth International Joint Conference on Artificial Intelligence.
Moncur, W., and Reiter, E. (2007). How Much to Tell? Disseminating Affective Information across a Social Network. Proceedings of Second International Workshop on Personalisation for e-Health.
Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.
Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07), pp. 227-236.
Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.
Reiter, E. (2007). An architecture for Data-To-Text systems. In: Busemann, Stephan (Ed.), Proceedings of the 11th European Workshop on Natural Language Generation, pp. 97-104.
Reiter, E., Sripada, S., Hunter, J., Yu, J., and Davy, I. (2005). Choosing words in computer-generated weather forecasts. Artificial Intelligence, 167:137-169.
Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.
Robin, J. (1996). Evaluating the portability of revision rules for incremental summary generation. Paper presented at Proceedings of the 34th. Annual Meeting of the Association for Computational Linguistics (ACL'96), Santa Cruz, CA.
Rui, Y., Gupta, A., and Acero, A. 2000. Automatically extracting highlights for TV Baseball programs. In Proceedings of the eighth ACM international conference on Multimedia. (Marina del Rey, California, United States). ACM Press, New York, NY 105-115.
Sripada, S., Reiter, E., and Davy, I. (2003). SumTime-Mousam: Configurable Marine Weather Forecast Generator. Expert Update 6(3):4-10.

(56) References Cited

OTHER PUBLICATIONS

Theune, M., Klabbers, E., Odijk, J., dePijper, J., and Krahmer, E. (2001) "From Data to Speech: A General Approach", Natural Language Engineering 7(1): 47-86.
Thomas, K., Sumegi, L., Ferres, L., and Sripada, S. (2008). Enabling Access to Geo-referenced Information: Atlas.txt. Proceedings of the Cross-disciplinary Conference on Web Accessibility.
Thomas, K., and Sripada, S. (2007). Atlas.txt: Linking Geo-referenced Data to Text for NLG. Paper presented at Proceedings of the 2007 European Natural Language Generation Workshop (ENLGO7).
Thomas, K., and Sripada, S. (2008). What's in a message? Interpreting Geo-referenced Data for the Visually-impaired. Proceedings of the Int. conference on NLG.
van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Graphical Displays in Neonatal Intensive Care. Applied Cognitive Psychology.
Yu, J., Reiter, E., Hunter, J., and Mellish, C. (2007). Choosing the content of textual summaries of large time-series data sets. Natural Language Engineering, 13:25-49.
Yu, J., Reiter, E., Hunter, J., and Sripada, S. (2003). Sumtime-Turbine: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).
Office Action for U.S. Appl. No. 13/186,346 dated May 29, 2013.
Office Action for U.S. Appl. No. 13/464,675 dated Jul. 24, 2013.
Allen et al., "StatsMonkey: A Data-Driven Sports Narrative Writer", Computational Models of Narrative: Papers from the AAAI Fall Symposium, Nov. 2010, 2 pages.
Notice of Allowance for U.S. Appl. No. 12/779,683 dated Nov. 26, 2012.
Office Action for U.S. Appl. No. 12/779,668 dated Apr. 6, 2012.
Office Action for U.S. Appl. No. 12/779,683 dated Apr. 9, 2012.
Office Action for U.S. Appl. No. 13/464,675 dated Nov. 8, 2012.
Reiter et al., "Building Applied Natural Generation Systems", Cambridge University Press, 1995, pp. 1-32.
Response to Office Action for U.S. Appl. No. 12/779,668 dated Apr. 6, 2012.
Response to Office Action for U.S. Appl. No. 12/779,683 dated Apr. 9, 2012.
Riedl et al., "Narrative Planning: Balancing Plot and Character", Journal of Artificial Intelligence Research, 2010, pp. 217-268, vol. 39.
U.S. Appl. No. 12/779,636, filed May 13, 2010 (Birnbaum et al.).
U.S. Appl. No. 12/779,668, filed May 13, 2010 (Birnbaum et al).
U.S. Appl. No. 12/779,683, filed May 13, 2010 (Birnbaum et al.).
U.S. Appl. No. 13/186,308, filed Jul. 19, 2011 (Nichols et al.).
U.S. Appl. No. 13/186,329, filed Jul. 19, 2011 (Nichols et al.).
U.S. Appl. No. 13/186,346, filed Jul. 19, 2011 (Nichols et al.).
U.S. Appl. No. 13/464,635, filed May 4, 2012 (Nichols et al.).
U.S. Appl. No. 13/464,675, filed May 4, 2012 (Nichols et al.).
U.S. Appl. No. 13/464,716, filed May 4, 2012 (Nichols et al.).
Notice of Allowance U.S. Appl. No. 12/779,668 dated Dec. 14, 2012.
Office Action for U.S. Appl. No. 12/779,636 dated Apr. 25, 2013.
Office Action for U.S. Appl. No. 13/464,716 dated Feb. 5, 2013.

700

| Subject Identifier (704) | Applicable Angles (706) | Importance Values (708) | Interestingness Value (710) |
|---|---|---|---|
| Subject 1 | Story Angle 1<br>Story Angle 2 | X<br>Y | A |
| Subject 2 | Story Angle 2 | Y | B |
| Subject 3 | Story Angle 1<br>Story Angle 3 | X<br>Z | C |

METHOD AND APPARATUS FOR TRIGGERING THE AUTOMATIC GENERATION OF NARRATIVES

CROSS-REFERENCE AND PRIORITY CLAIM TO RELATED PATENT APPLICATIONS

This patent application is a continuation-in-part of the following patent applications: U.S. application Ser. No. 12/986,996, entitled "Configurable and Portable System for Generating Narratives", filed Jan. 7, 2011 now abandoned, U.S. application Ser. No. 12/986,981, entitled "Use of Tools and Abstraction in a Configurable and Portable System for Generating Narratives", filed Jan. 7, 2011 now abandoned, and U.S. application Ser. No. 12/986,972, entitled "Configurable and Portable System for Generating Narratives", filed Jan. 7, 2011 now abandoned; the entire disclosures of each of which are incorporated herein by reference.

This patent application is related to the following patent applications: U.S. application Ser. No. 13/186,329, entitled "Method and Apparatus for Triggering the Automatic Generation of Narratives", filed this same day, U.S. application Ser. No. 13/186,308, entitled "Method and Apparatus for Triggering the Automatic Generation of Narratives", filed this same day, U.S. application Ser. No. 13/186,346, entitled "Method and Apparatus for Triggering the Automatic Generation of Narratives", filed this same day, U.S. application Ser. No. 12/779,636, entitled "System and Method for Using Data to Automatically Generate a Narrative Story", filed May 13, 2010, U.S. application Ser. No. 12/779,668, entitled "System and Method for Using Data and Derived Features to Automatically Generate a Narrative Story", filed May 13, 2010, and U.S. application Ser. No. 12/779,683, entitled "System and Method for Using Data and Angles to Automatically Generate a Narrative Story", filed May 13, 2010; the entire disclosures of each of which are incorporated herein by reference.

BACKGROUND AND SUMMARY OF THE INVENTION

The cross-referenced and incorporated patent applications disclose various techniques for automatically generating narrative stories from raw data using various algorithms and data structures. For example, these patent applications describe how a narrative story about a baseball game can be automatically generated from a box score, line score, and play-by-play of that baseball game. Various derived features can be computed from these raw data, and a story generator can leverage these derived features along with the raw data to assess what angles apply to the baseball game—for example, was the game a "come from behind victory" for one of the teams?—and these angles are then used to determine what should be included in a narrative story about the game.

The cross-referenced and incorporated patent applications also disclose that these derived features can be used to determine whether it is desirable to write a narrative story about a subject in the first place. As an example, these cross-referenced and incorporated patent applications disclose that the raw data can be compared with a threshold to produce a derived feature that governs whether a narrative story will be written about a subject in the first place.

In this patent application, the inventors expand upon this concept of evaluating the circumstances under which it is desirable to automatically generate a narrative story about a subject, and disclose various software and hardware implementations that can be used to evaluate data to decide whether a narrative story is to be generated.

In an exemplary embodiment, a story evaluation method comprises (1) accessing an angle set data structure in a memory, the angle set data structure comprising (i) data representative of at least one story angle and (ii) data associated with the at least one story angle that is representative of at least one applicability condition for the associated at least one story angle, (2) processing data against the angle set data structure to determine whether at least one applicability condition for at least one story angle has been satisfied by the processed data, and (3) in response to the processing step, generating an evaluation indicator, the evaluation indicator being indicative of whether a narrative story relating to the processed data is to be generated, and wherein the method steps are performed by a processor.

In another exemplary embodiment, a computer program product for story evaluation comprises a plurality of instructions that are executable by a processor to (1) access an angle set data structure in a memory, the angle set data structure comprising (i) data representative of at least one story angle and (ii) data associated with the at least one story angle that is representative of at least one applicability condition for the associated at least one story angle, (2) process data against the angle set data structure to determine whether at least one applicability condition for at least one story angle has been satisfied by the processed data, and (3) in response to the processing operation, generate an evaluation indicator, the evaluation indicator being indicative of whether a narrative story relating to the processed data is to be generated, and wherein the plurality of instructions are resident on a non-transitory computer-readable storage medium.

In yet another exemplary embodiment, a story evaluation apparatus comprises (1) a memory for storing an angle set data structure, the angle set data structure comprising (i) data representative of at least one story angle and (ii) data associated with the at least one story angle that is representative of at least one applicability condition for the associated at least one story angle, and (2) a processor configured to (i) process data against the angle set data structure to determine whether at least one applicability condition for at least one story angle has been satisfied by the processed data, and (ii) in response to the processing operation, generate an evaluation indicator, the evaluation indicator being indicative of whether a narrative story relating to the processed data is to be generated.

In another exemplary embodiment, the inventors disclose a method comprising (1) processing data against a plurality of conditions, (2) computing interestingness data relating to the processed data in response to the processing step, (3) comparing the interestingness data with a threshold, and (4) determining whether to automatically generate a story relating to the processed data in response to the comparing step, and wherein the method steps are performed by a processor.

In another exemplary embodiment, the inventors disclose a computer program product comprising a plurality of instructions that are executable by a processor to (1) process data against a plurality of conditions, (2) compute interestingness data relating to the processed data in response to the processing operation, (3) compare the interestingness data with a threshold, and (4) determine whether to automatically generate a story relating to the processed data in response to the comparison operation, and wherein the plurality of instructions are resident on a non-transitory computer-readable storage medium.

In yet another exemplary embodiment, the inventors disclose an apparatus comprising a processor configured to (1) process data against a plurality of conditions, (2) compute interestingness data relating to the processed data in response to the processing operation, (3) compare the interestingness data with a threshold, and (4) determine whether to automatically generate a story relating to the processed data in response to the comparison operation.

Further still, as another exemplary embodiment, the inventors disclose an apparatus comprising (1) a memory for storing data about at least one story angle, and (2) a processor for interacting with the memory to execute a software program, the software program comprising a story evaluator module, the story evaluator module configured to process data relating to a subject against the story angle data to determine whether a narrative story about the subject is to be automatically generated.

In yet another exemplary embodiment, the inventors disclose a story evaluation method comprising (1) receiving data representative of financial instrument information, (2) determining whether any of a plurality of story angles are applicable to the financial instrument information by testing a plurality of applicability conditions for the story angles against the received data, and (3) in response to the determining step determining that at least one of the story angles is applicable to the financial instrument information, automatically generating a narrative story about the financial instrument information, wherein the narrative story incorporates the at least applicable story angle, and wherein the method steps are performed by a processor.

These and other features and advantages of the present invention are disclosed herein and will be understood by those having ordinary skill in the art upon review of the description and figures hereinafter.

BRIEF DESCRIPTION OF THE DRAWINGS

FIGS. 7(a)-7(c) depict various data structures relating to story generation requests according to various exemplary embodiments.

DETAILED DESCRIPTION OF THE PREFERRED EMBODIMENTS

Figure 1:
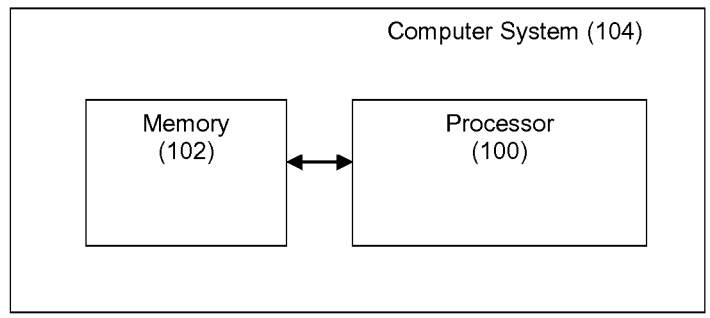
FIG. 1 depicts a computer system according to an exemplary embodiment.

FIG. 1 depicts an exemplary processor 100 and associated memory 102 which can be configured to implement the story evaluation and story generation processes described herein in accordance with exemplary embodiments of the invention. The processor 100 and associated memory 102 may be deployed in a computer system 104. Such a computer system 104 can take any of a number of forms, including but not limited to one or more personal computers, servers, laptop/notebook/tablet computers, personal digital assistants (PDAs), or combinations of the same. For example, the computer system 104 can take the form of the processing device disclosed in the cross-referenced patent applications that have been incorporated herein. The processor 100 may comprise a single processor or multiple processors, including multiple processors that are physically remote from each other. Similarly, the memory 102 can take the form of one or more physical memories. Moreover, the memory 102 can be physically remote from processor 100 if desired by a practitioner, such as a remote database accessible to the processor 100 via a network such as the Internet. Examples of suitable memories for use as memory 102 can be RAM memory, ROM memory, hard disk drive memory, etc.

The processor 100 can be configured to execute one or more software programs. These software programs can take the form of a plurality of processor-executable instructions that are resident on a non-transitory computer-readable storage medium such as memory 102.

Figure 2:
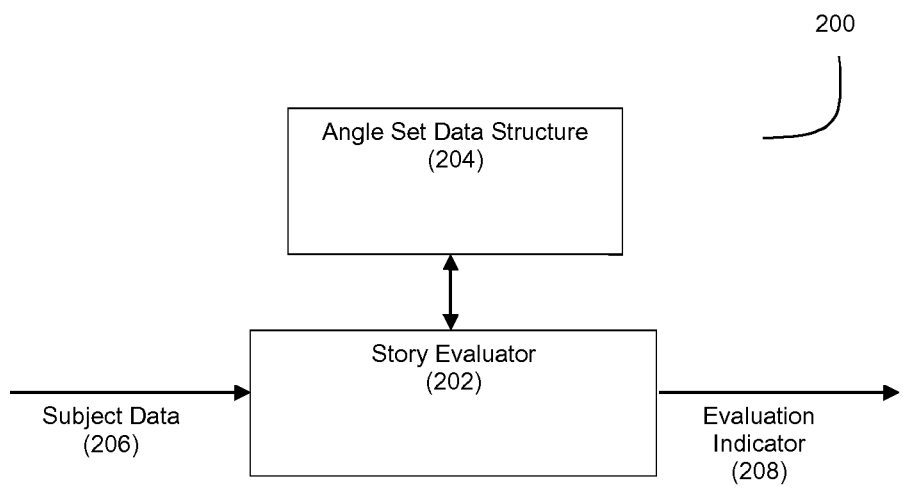
FIG. 2 depicts an exemplary embodiment configured to perform a story evaluation process.

FIG. 2 depicts a story evaluation process 200 in accordance with an exemplary embodiment of the invention. A story evaluator module 202 processes subject data 206 against an angle set data structure 204 to generate an evaluation indicator 208. The evaluation indicator 208 serves to identify whether a narrative story relating to the data 206 is to be generated. The story evaluator 202 may be triggered to operate on a scheduled basis (e.g., operating at particular dates/times (e.g. the close of trading for the day on a particular stock market, every X units of time, etc.) or on an event-driven basis (e.g. in response to a signal from another module). These various operating modes are not mutually exclusive. For example, a story evaluator may be configured to evaluate certain story angles at the close of the NYSE trading day, and to evaluate certain story angles in response to receipt of subject data from another module, such as subject selector module 400 described below.

The angle set data structure 204 comprises (1) data representative of at least one story angle, and (2) at least one applicability condition for the story angle. In a preferred embodiment, the angle set data structure 204 comprises (1) data representative of a plurality of different story angles, and (2) a plurality of applicability conditions for each of the story angles. As such, the story evaluator module 202 executed by the processor 100 can process the subject data 206 against the applicability conditions of the different story angles as represented by the angle set data structure 204 to make a judgment about whether a narrative story should be generated for a given subject or plurality of subjects from subject data 206. The judgment of the story evaluator can be expressed via the evaluation indicator 208.

The subject data 206 may comprise a plurality of data elements relating to one or more subjects. The subject data 206 can be structured data whose format is known by the story evaluator 202 (e.g., XML data of a known format, stock feed data of a known format, etc.); however, this need not be the case. Also, it should be understood that in some embodiments, the subject or subjects relating to subject data 206 may not be known in advance by the story evaluator. One of the roles of the story evaluator can be to determine which subject or subjects are relevant to the data 206 (see FIG. 4(c) described below). Examples of subjects that may relate to data 206 include but are not limited to company stock information (e.g., stock price information for Acme Corp.), and sports information (e.g., baseball game box scores). However, it should be understood that the range of subjects relating to the data 206 and about which narrative stories can be evaluated and generated in accordance with various embodiments can be virtually any user-defined subject(s) as described in the above-referenced and incorporated patent applications.

The evaluation indicator 208 can take any of a number of forms. For example, the evaluation indicator 208 can be a binary yes/no flag in association with a particular subject or a particular portion of data 206, wherein a "yes" status indicates that a story is to be generated about the subject or data while a "no" flag indicates that story is not to be generated about the subject or data. As another example, the evaluation indicator 208 can be a score value (e.g., a score in the range of 1-10), wherein the score value indicates a level of interest relevant to whether a story is to be generated about the subject or data.

Figure 3:
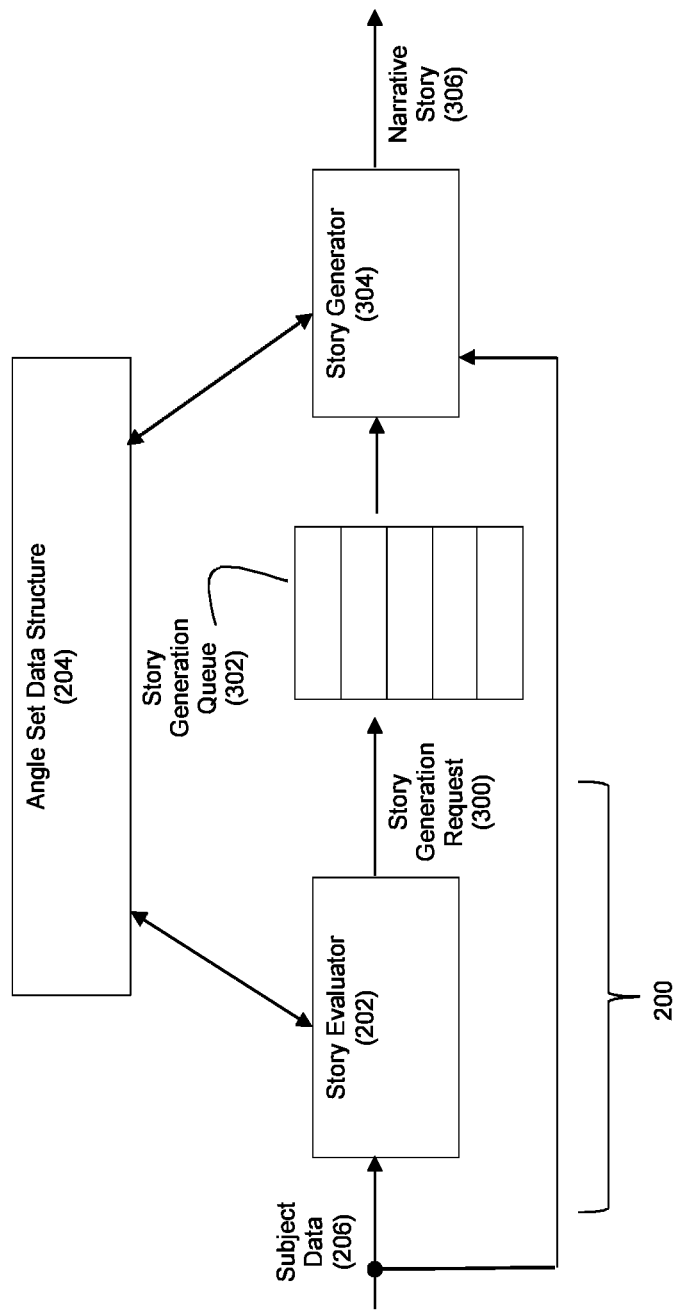
FIG. 3 depicts another exemplary embodiment employing a story evaluation process.

In an exemplary embodiment, evaluation indicator 208 may comprise a data structure having a plurality of fields such as a story generation request 300 as shown in FIG. 3. Such a story generation request can include a field indicative of the relevant subject or data for which a story is to be generated and a field indicative of the angle (or angles) for use in such a story. These fields can be indirectly indicative of the relevant subject or data. These fields can also be indirectly indicative of the angle or angles for use in a story. For example, the story generation request may include a story type, where the story type is associated with the angle or angles for use in the story. For example, the story generation request may comprise a story type with associated angles, without being limited to a particular subject. It should be understood that the story generation requests produced by the story evaluator 202 can include more, fewer, and/or different fields if desired by a practitioner.

With the exemplary embodiment of FIG. 3, a story generation queue 302 may be employed to store the story generation requests 300 produced by the story evaluator 202. However, it should be understood that the story generation queue 302 is optional. In embodiment where story generation requests are created by the story evaluator, the story evaluator can deliver story generation requests directly to a story generator module. Furthermore, in an exemplary embodiment in which the story evaluator module 202 is combined with the story generator module 304 in a single integrated application, story generation requests 300 may be implemented within the integrated application, without using external data structures.

As disclosed by FIG. 3, a story generator module 304 executed by processor 100 can read story generation requests 300 out of the queue 302 to automatically generate narrative stories 306 for the subject data 206 in accordance with the story generation requests 300. Examples of a suitable story generator module 304 are disclosed in the cross-referenced patent applications that have been incorporated herein (U.S. application Ser. Nos. 12/986,996, 12/986,981, 12/986,972, 12/779,636, 12/779,668, and 12/779,683). As disclosed in those patent applications, the story generator 304 can leverage angles (e.g. angles from the angle set data structure 204) to facilitate the automatic generation of narrative stories from subject data.

It should be noted that the angle set data structure 204 can be shared by the story evaluator 202 and the story generator 304. However, this need not be the case as both modules could employ their own associated angle set data structures. Moreover, even in embodiments wherein the angle set data structure 204 is shared between the story evaluator 202 and the story generator 304, it should be understood that the angles used by the story evaluator 202 to determine whether a story should be generated need not be the same angles used by story generator 304 to govern the content of the resultant narrative story 306. For example, the angles used by the story evaluator may be a sub-set of the angles used by the story generator, as described in detail below.

Also, while FIG. 3 shows that the subject data 206 is directly provided to both the story evaluator 202 and the story generator 304, it should be understood that alternate arrangements could be employed. For example, each story generation request 300 can include the relevant subject data for that request 300. This relevant subject data can include less, more, and/or different fields of data about the subject than those found in the incoming subject data 206.

Figure 4A:
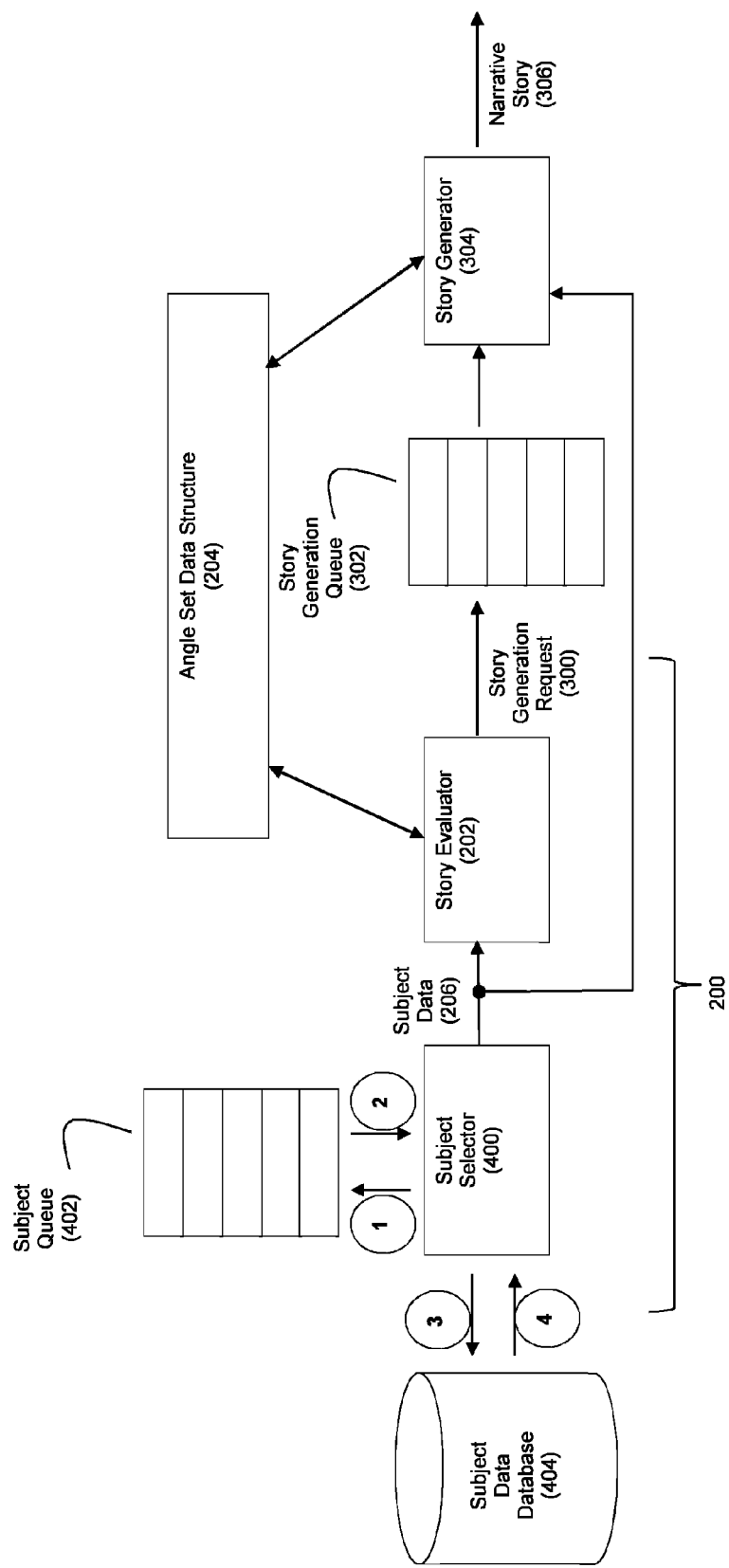
FIGS. 4(a)-4(c) depict additional exemplary embodiments employing a story evaluation process.

FIG. 4(a) depicts an exemplary embodiment wherein the story evaluation process 200 includes a subject selector module 400. In this example, a subject queue 402 will store a list of subjects that are to be evaluated for potential stories. The subject selector module 400 executed by processor 100 reads items from the queue 402 to identify the subjects for evaluation. Upon identifying a subject in response to reading a queued subject, the subject selector 400 can then query a subject data database 404 for the subject data relevant to the identified subject. The subject selector 400 can then pass the subject data received from the database 404 in response to this query to the story evaluator 202. In an exemplary embodiment wherein the system is employed to evaluate whether narrative stories are to be generated about financial instruments, subject queue 402 may store a list of financial instrument identifiers. For example, in an embodiment wherein the subjects include stock price information for various companies, the subject queue 402 can store a list of different company identifiers (e.g., stock ticker symbols for such companies). Upon reading a company identifier from queue 402, the subject selector 400 can query database 404 for data about the company corresponding to the read company identifier. With reference to FIG. 4(a), this could proceed as (1) subject selector 400 accesses queue 402, (2) subject selector reads a company identifier from the queue 402 (e.g., the ticker symbol MSFT), (3) the subject selector 400 queries database 404 for stock price information about the company identifier (MSFT), and (4) the subject selector 400 receives the subject data 206 relevant to the company identifier (e.g., stock price information for MSFT) for processing by story evaluator 202. In turn the story evaluator 202 operates to process subject data 206 to determine whether a narrative story should be generated about the company identified by the company identifier (e.g., the story evaluator 202 will determine based on the angle set data structure 204 whether there are any interesting aspects of the stock price information for MSFT that merits a story about MSFT).

Figure 4B:
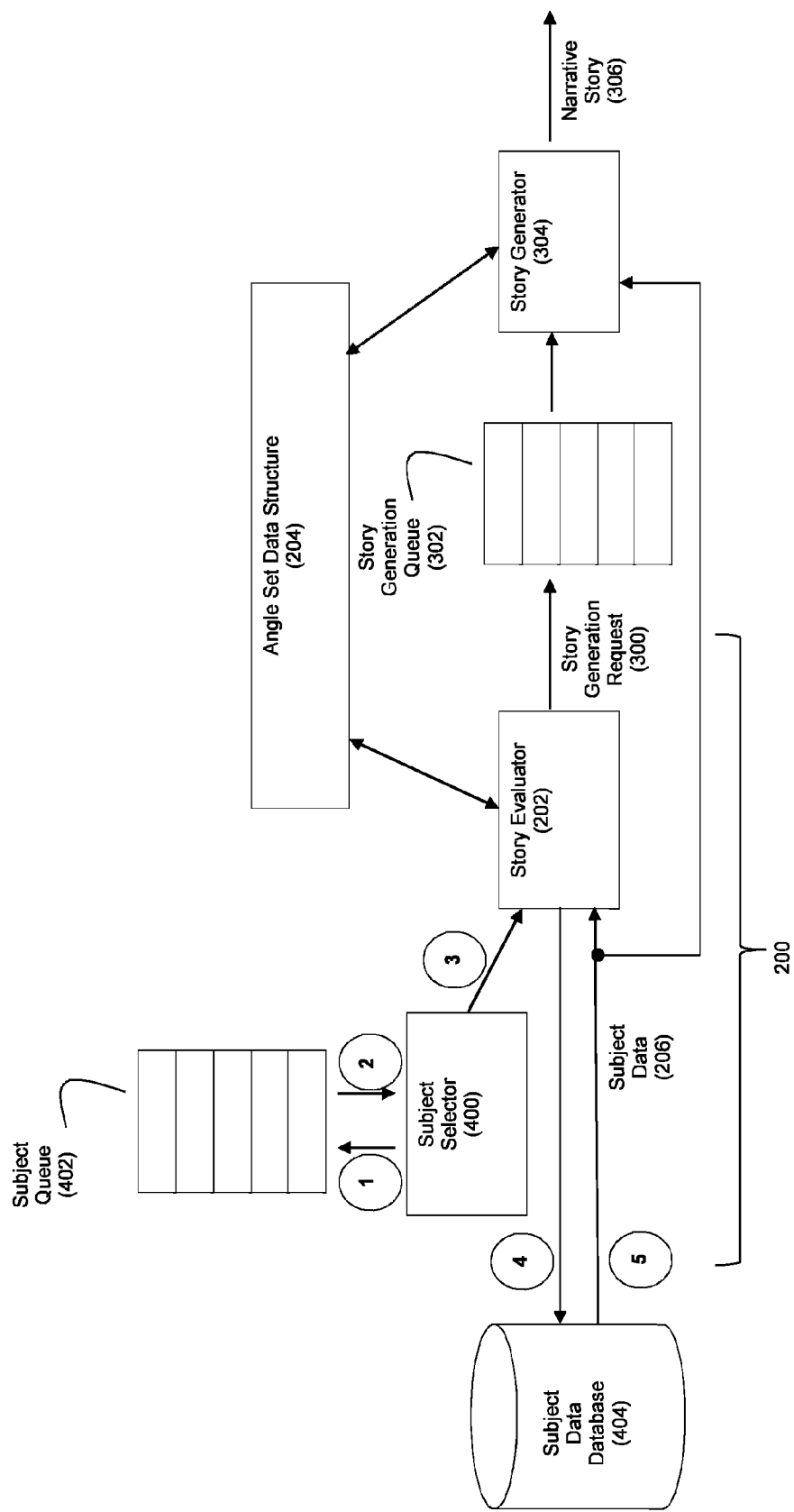
Figure 4C:
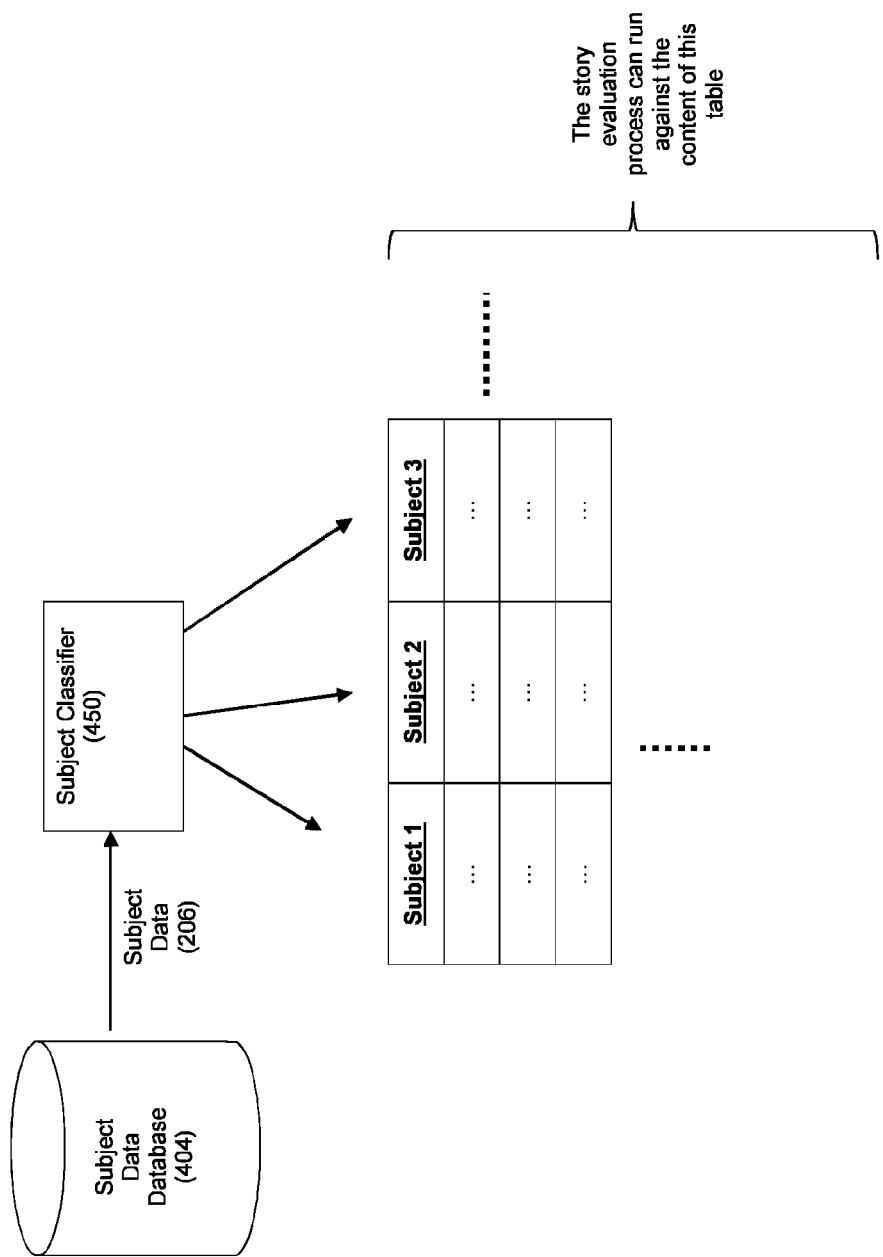

FIG. 4(b) depicts another exemplary embodiment wherein the story evaluator 202 directly queries a database (subject data database 404). With this embodiment, (1) subject selector 400 accesses queue 402, (2) subject selector reads a company identifier from the queue 402 (e.g., the ticker symbol MSFT), (3) subject selector communicates the read company identifier to the story evaluator 202, (4) the story evaluator 202 queries database 404 for stock price information about the company identifier (MSFT), and (5) the story evaluator 202 receives the subject data 206 relevant to the company identifier (e.g., stock price information for MSFT) for processing by story evaluator 202.

Subject queue 402 may be populated by a user of the system such that it includes the subjects that are of interest to the user. For example, in an embodiment where the subjects of interest are companies, and where the story evaluator 202 is programmed to determine whether the stock price information for those companies of interest is worthy of generating a narrative story, a user can populate the queue with identifiers for those companies of interest. The subject selector 400 can in turn be programmed to periodically loop through the queue 402 to repetitively feed the story evaluator 202 with stock price information about these companies of interest, enabling the story evaluator 202 to regularly check whether a story about any of those companies should be triggered.

In an exemplary embodiment, queue 402 comprises an ordered list of possible story subjects (e.g. a linked list of stock ticker symbols). Subject selector module 400 may be configured to iterate through queue 402 in order, selecting each possible story subject in the list for analysis in order (e.g., in a repeating loop wherein the last item in queue 402 points to the first item). The list of possible story subjects in queue 402 may be static (modified by user input) or dynamic (automatically modified by the system in real-time based on pre-set parameters).

The frequency with which subjects are evaluated may vary depending upon how important or dynamic they are. For example, queue 402 may also be implemented as a set of related queues where the time period for looping through these queues varies. The subjects on queues that are more frequently checked might be those which are more important or for which news tends to arise more frequently; and subjects might be moved among these queues as assessments of their relative importance or of the frequency with which news about them arises change.

In an exemplary embodiment, queue 402 is populated by an event-driven process. For example, queue 402 may be populated with potential story subjects in real-time as they are received from an external source, such as a data feed from another system. Subject selector module 400 may be configured to select each potential subject from queue 402 in the order it was received, and pass the potential subject to the story evaluator module. For example, the system may receive a data feed from a server via a network such as the internet. The data feed may comprise possible subjects and data associated with the possible subjects. For example, queue 402 and subject database 404 may be populated by a one or more financial instrument data feeds.

In an exemplary embodiment, the system can be configured to store a filter list for use in conjunction with a data feed to filter possible story subjects. For example, the system may store a user-configurable "include list" of subjects that is used to filter a data stream of potential subjects such that only subjects that appear in the include list are added to queue 402. The system may also store a user-configurable "exclude list" that is used to filter a data stream by excluding subjects on the exclude list from queue 402. Filter lists may be static (modified by user input) or dynamic (automatically modified by the system in real-time based on pre-set parameters). For example, a filter list may change based on date/time or based on historical data.

FIG. 4(*c*) illustrates an exemplary embodiment wherein the story evaluation process 200 includes a subject classifier module 450 configured to analyze data 206 to determine one or more subjects relating to that data. The subject classifier 450 can be configured to search for one or more fields in the incoming data 206 to facilitate subject classification. For example, in an embodiment where incoming data 206 is a feed of stock prices, the subject classifier can be configured to update data tables corresponding to different subjects based on the content of the data feed. Different subjects can include company-specific subjects (e.g., the stock prices for ticker symbol X), sector-specific subjects (e.g., the stock prices for ticker symbols of companies within a particular sector), etc. The story evaluator can then be configured to access the subject data in these tables and perform story evaluation thereon. In this fashion, the story evaluator can evaluate data 206 for which the related subject or subjects are not known in advance.

Figure 5A:
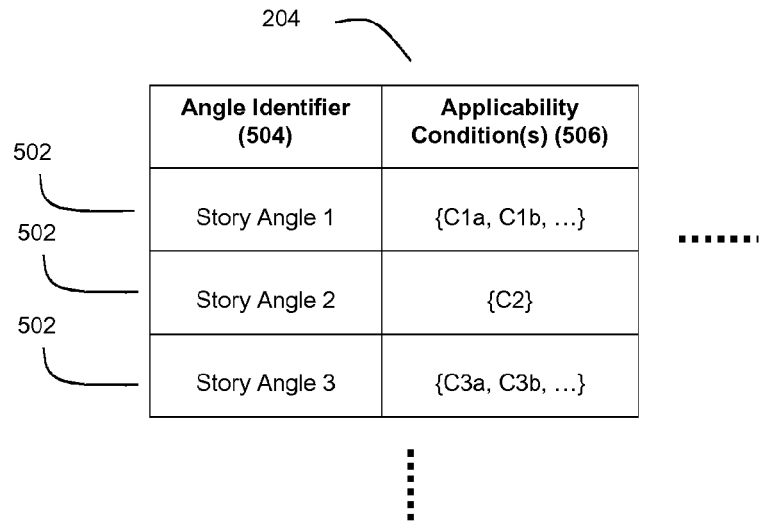
FIGS. 5(a)-5(c) depict various exemplary angle set data structures.
Figure 5B:
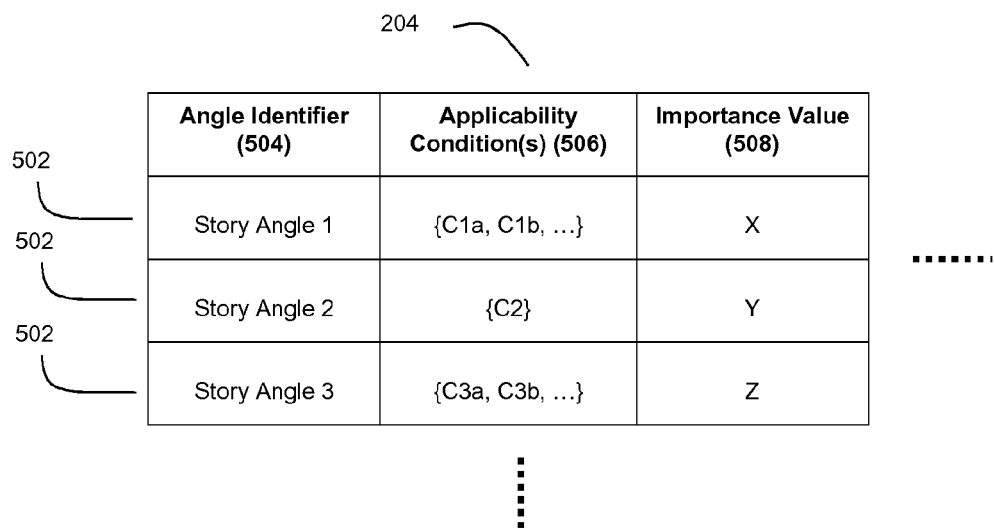
Figure 5C:
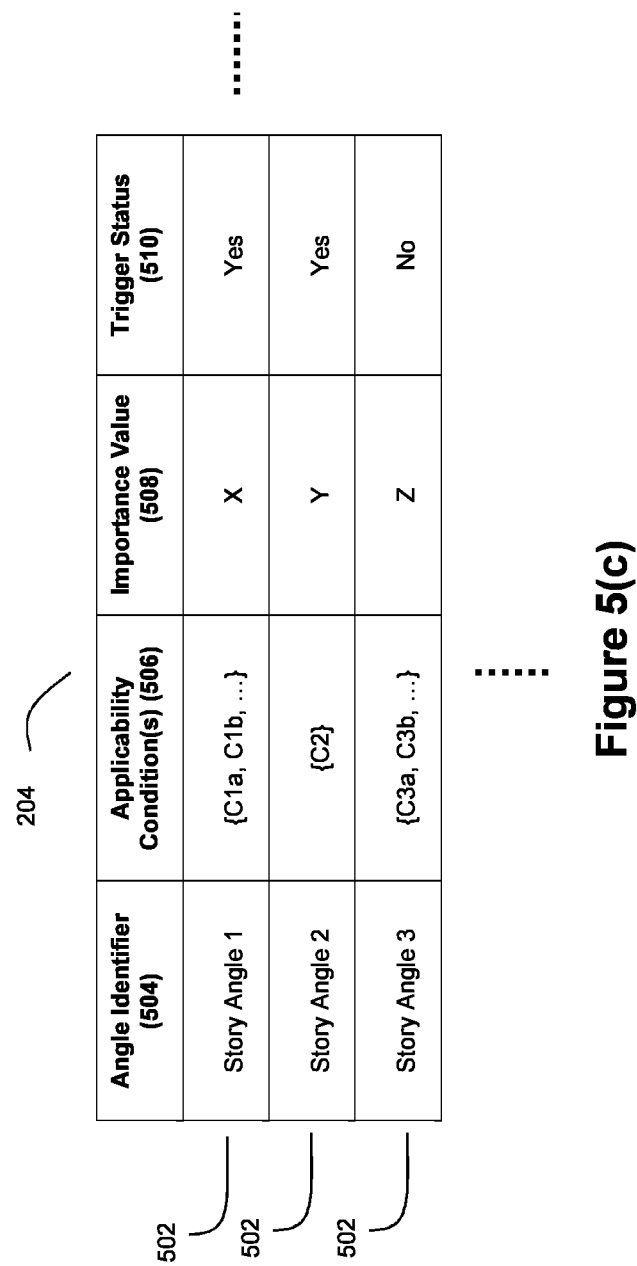

FIGS. 5(*a*)-5(*c*) depict exemplary embodiments for angle set data structure 204. Angle set data structure 204 may be implemented by a variety of techniques as will be apparent to those of ordinary skill in the art. For example, an angle set data structure may be represented by data in a relational database, conditional (e.g. if/then/else) instructions in a software program, parameters in a configuration file, etc.

FIG. 5(*a*) depicts an exemplary angle set data structure 204 that comprises a plurality of story angles 502 (as represented by the story angle identifiers in column 504), with corresponding applicability conditions (as represented by applicability conditions C in column 506). Applicability conditions 506 are used to determine whether the corresponding story angle is applicable to given subject data 206.

In an exemplary embodiment, the angle set data structure may be optimized such that applicability conditions that are shared between multiple story angles can be combined for common testing with respect to data 206 during the story evaluation process. For example, if applicability condition C1a for Story Angle 1 is the same as applicability condition C3b for Story Angle 3, then the story evaluator can be configured to test the data 206 against the C1a/C3b condition only once to avoid redundancy.

A practitioner can configure the angle set data structure to support any of a plurality of different story angles. Furthermore, angle set data structures may be defined directly by users. They may also be generated automatically from the specifications of the story types utilized by the story generator 304. As disclosed in the cross-referenced patent applications that have been incorporated herein (U.S. application Ser. Nos. 12/986,996, 12/986,981, 12/986,972, 12/779,636, 12/779, 668, and 12/779,683), these story specifications specify angles or angle sets relevant to generating stories of the given type. The angles in the angle sets contained in the angle set data structure 204 utilized by the story evaluator 202 may be collected from these story specifications in various ways. For example, angles in the story specifications may be specifically labeled as relevant to triggering stories of that type, in which case they will be collected into an angle set for that story type and placed in the angle set data structure 204. Alternatively, angles in the specification may be collected based on their importance and/or interestingness (which are properties of angles as disclosed in the cross-referenced patent applications). In yet another approach, angles may be collected for inclusion in an angle set because they are included in a particular component of the story specification (for example, the lede content block, corresponding to the first or major paragraph in the resulting story).

In embodiments where the subjects of data 206 relate to financial information, examples of story angles for use in such embodiments may include a "52 week high" story angle and a "gapping" story angle (which is potentially applicable when the opening price for a stock on a given trading day differs from the closing price on the preceding trading day). However, it should be understood that additional and/or different story angles can be represented in the angle set data structure. The "52 week high" story angle can be configured to support the generation of a narrative story about a stock price reaching a 52 week high. The applicability condition(s) C for this angle would include a condition requiring that the subject stock price exceeds the 52 week high. An exemplary data structure for a 52 week high story angle is provided in the pseudo-code in the detailed example below. The "gapping" story angle can be configured to support the generation of a narrative story about a stock price having a large change between a market close and the next market open. The applicability condition(s) C for the gapping story angle may include a condition requiring a certain percentage change or magnitude change in stock price that exceeds a pre-set threshold between the close of trading on one day and the open of trading on a subsequent day.

Applicability conditions 506 may be implemented as conditional statements that evaluate to true or false based on one or more variables, such as raw data and/or derived features processed by the story evaluator, as well as system variables such as date and time. For example, an angle could have a single applicability condition that is satisfied by an event (e.g. at a particular date and time), and thus the story evaluator may be configured to generate a story generation request in response to the pre-set event (e.g. at a pre-set date and time or when certain pre-set data are received). As another example, another event-based applicability condition may comprise receipt of a particular data set, such as a quarterly earnings data.

FIG. 5(*b*) depicts another exemplary angle set data structure 204. Relative to the embodiment of FIG. 5(*a*), this embodiment further comprises an importance value 508. Importance value 508 serves as an indicator of relative importance of the corresponding story angle 502, and may be utilized when determining the interestingness of a story angle as described in detail below. In an exemplary embodiment, story evaluator 202 may be configured to consider a story angle 502 during story evaluation if the corresponding importance value 508 exceeds a pre-set threshold. Furthermore, the importance value 508 for an applicable story angle can be combined with other data to facilitate decision making processes in connection with narrative stories.

FIG. 5(*c*) depicts yet another exemplary angle set data structure 204. Relative to the embodiments of FIGS. 5(*a*) and 5(*b*), this embodiment further comprises a trigger status 510. Trigger status 510 indicates whether the corresponding story angle 502 should be used by the story evaluator module 202 when determining whether or not to create a story generation request. In yet another exemplary embodiment, the angle set data structure 204 may include the trigger status 510 instead of importance value 508.

FIGS. 6(*a*)-6(*i*) depict flow diagrams for various exemplary embodiments of the story evaluation process (e.g. story evaluator module 202).

In the exemplary embodiment of FIG. 6(*a*), the story evaluator module 202 begins at step 600 where it receives source data. The source data can take the form of raw data from a remote data source for evaluation. For example, subject selector 400 may be configured to deliver subject data 206 to the story evaluator module 202. Or as another example, story evaluator module 202 may be configured to query subject data database 404 on an as-needed basis. However, as noted above, the subject or subjects relating to the source data need not be known in advance by the story evaluator.

At step 602 the story evaluator generates a data model based on the source data. This may involve parsing, filtering, and/or normalizing the source data to a standardized data model for analysis against the story angles. As an example, the data model may take the form of XML data having a plurality of data type fields with corresponding data values. Exemplary data models for embodiments where the story evaluator is used to evaluate stock price information are shown in FIGS. 9(*a*) and (*b*).

At step 604, the story evaluator accesses data from angle set data structure 204 for a first story angle 502 to be tested. As discussed above, the story evaluator may be configured to ignore story angles for which a corresponding importance value 508 is below a pre-set threshold, or for which a corresponding trigger status 510 is set to "no."

At step 606, the story evaluator identifies derived features that are relevant to the applicability conditions of the current angle being tested. It should be understood that in some circumstances, no derived features need to be calculated. For example, the relevant angle may not require a derived feature to be computed in order to fully test the current angle. The derived features can take any of a number of forms as described in the above-referenced and incorporated patent applications. The derived features are preferably a function of data in the data model, and in some circumstances may be functions of other data such as system data or data that is to be cross-correlated against data in the data model. Furthermore, the derived features can be aggregated derivations from one or more portions of one or more data models. In an embodiment where the story evaluator is used to evaluate stock price information, examples of derived features can include a calculated price change for a stock (e.g., price change since closing on the previous trading day), a calculated stock price performance relative to a benchmark (e.g., performance relative to an index such as the Dow Jones Industrial Average, S&P 500), etc.

At step 608, the story evaluator computes the derived features identified at step 606. Thus, in the embodiment of FIG. 6(*a*), the story evaluator computes derived features according to an "as-needed evaluation" scheme. That is, derived features are calculated on an as needed basis for each angle that is tested.

Optionally, the angle set data structure may include data that associates each applicability condition (or story angle) with the derived features (and formulae or algorithms for computing those derived features) needed for testing. Through such associations, the story evaluator can determine at step 606 which derived features are needed and in turn compute those derived features at step 608.

At step 610, computed derived features are stored in the data model. At step 612, the story evaluator tests the applicability conditions 506 of the current angle against the data model (e.g., by comparing the data values of the data model against the applicability conditions), and conditionally branches to either step 614 or step 616. If the conditions of the current angle are satisfied by the subject data model, then the flow proceeds to step 614, otherwise the flow proceeds directly to step 616. At step 614 the story evaluator generates a story generation request 300 and inserts it into story generation queue 302. From step 614, flow may proceed to step 616. At step 616, the story evaluator loads the next angle from angle set data structure 204. As such, the process flow of FIG. 6(*a*) continues to test the data model against the applicability conditions of the angles of the angle set data structure until it finds an angle whose applicability conditions are satisfied by the data model (which results in a story generation request) or until all angles are found inapplicable (in which case no story is to be generated from the data model).

FIG. 6(*b*) depicts another exemplary flow diagram for story evaluator 202. Relative to the embodiment of FIG. 6(*a*), this embodiment further comprises steps 618-622. At step 618, an identifier for the current story angle 502 is stored, indicating that the conditions for the current angle were satisfied and the story angle applies to the data model. For example, the story angle identifiers for those angles may be stored in an "applicable angles" list. At step 620, the story evaluator checks to see whether all relevant angles have been tested. As described above, relevant angles may be limited to a subset of angles in the angle set data structure 204, e.g., based on importance value 508 or triggering status 510. If not all relevant angles have been tested, then flow proceeds to step 616 where the next angle is loaded. If all relevant angles have been tested, then flow proceeds to step 622.

At step 622, the story evaluator analyzes the results of the previous steps to generate a story generation request if appropriate. If the "applicable angles" list is empty, then step 622 preferably does not operate to generate a story generation request. For circumstances where the "applicable angles" list is not empty, any of a number of decision-making techniques can be employed at step 622 to determine whether a story generation request is to be generated. For example, step 622 can be configured to generate a story generation request if the "applicable angles" list is not empty. However, it should be noted that the decision at step 622 whether to create a story generation request 300 may be a more complex function of the applicable angles. For example, certain angles within an angle set data structure may be designated as required, either by the user or because they are angles of a certain type, of a certain level of importance, pertaining to a certain aspect of the story that would be generated as a result, etc. As another example, the story evaluator may compute a metric such as an aggregate value based on the importance values or other features of the applicable angles.

The story generation request may comprise an identifier for each story angle 502 from the "applicable angles" list (see FIG. 7(*a*)). The story generation request 300 may further comprise an importance value 508 corresponding to each applicable story angle 502 (see FIG. 7(*b*)). The importance value for each applicable story angle may be used by the story generator 304 to determine the relative placement of corresponding content in the generated narrative, as described below. The story generation request 300 generated at step 622 may be inserted into story generation queue 302.

FIG. 6(*c*) depicts yet another exemplary flow diagram for story evaluator 202. Relative to the embodiments of FIGS. 6(*a*)-6(*b*), this embodiment further comprises steps 624-628. In this embodiment, the data model comprises an interestingness data field. In an exemplary embodiment, the value for the interestingness data field may be initialized to zero. At step 612, if the current angle is found to be applicable, then the flow proceeds to step 624.

At step 624, the story evaluator updates the interestingness value for the data model based on the current angle 502. Any of a number of techniques can be used to compute an updated interestingness value for a data model. In an exemplary embodiment, the story evaluator computes the interestingness value to be indicative of a degree to which one or more aspects of the data model satisfied one or more applicability conditions. For example, if the story angle relates to a stock price exceeding its 52 week high, the story evaluator can be configured to compute an interestingness value for the data model relating to a particular stock to indicate by how much the stock price exceeded its 52 week high. Such a metric can compute interestingness as a function of percentage change or magnitude change. Thus, not only can the data model indicate whether or not a stock price exceeded its 52 week high but can also indicate how interesting this fact is (that is, a stock price beating its 52 week high by 100% would generally be considered much more interesting than a stock price beating its 52 week high by 0.5%). In another exemplary embodiment, step 622 updates the interestingness value by adding the importance value 508 for the current applicable angle 502 to the interestingness value for the data model.

From step 624, the flow proceeds to step 620 to check whether all relevant angles have been tested. At step 626, the story evaluator compares the interestingness value(s) for the data model to one or more interestingness thresholds. If the interestingness value exceeds the threshold, then the flow proceeds to step 628 where a story generation request is generated based on the applicable angles, as has been described above. Otherwise, the story evaluator creates an evaluation indicator indicating that a story should not be generated.

FIG. 6(*d*) depicts yet another exemplary flow diagram for story evaluator 202. Relative to the embodiments of FIG. 6(*a*)-6(*c*), this embodiment is configured to pre-compute derived features for all relevant angles up front (in contrast to the "as-needed evaluation" scheme of the embodiments of FIGS. 6(*a*)-6(*c*)). At step 604 in this embodiment, the story evaluator accesses data for all relevant angles (e.g. based on importance value 508 or triggering status 510). Then at step 606, the story evaluator identifies all of the derived features that are relevant to the applicability conditions for all of the relevant angles. Then at step 608 the story evaluator computes all of the identified derived features, and updates the data model at step 610. Then at steps 612-616, the story evaluator loops through the relevant angles, testing each angle against the subject data model to determine applicable angles. For applicable angles the story evaluator generates a story generation request at step 616.

FIG. 6(*e*) depicts yet another exemplary flow diagram for story evaluator 202. The embodiment of FIG. 6(*e*) is similar to the embodiment of FIG. 6(*b*), except that this embodiment uses the "up front" pre-computation of derived features, as in FIG. 6(*d*).

FIG. 6(*f*) depicts yet another exemplary flow diagram for story evaluator 202. The embodiment of FIG. 6(*f*) is similar to the embodiment of FIG. 6(*c*), except that this embodiment uses the "up front" pre-computation of derived features, as in FIGS. 6(*d*)-6(*e*).

FIG. 6(*g*) depicts yet another exemplary flow diagram for story evaluator 202. In the embodiment of FIG. 6(*g*), the story evaluator is configured to operate in an angle-centric mode. In this mode, the story evaluator may request data of a certain type or having a certain form, without specifying the subject or subjects to which these data apply. If the angle's conditions apply to the data, then a story generation request may be produced for the subject or subjects to which the data pertain. This is useful when stories are desired about subjects or groups of subjects that are not known in advance, and the subject(s) must be identified through analysis of the data. For example, (as described above) the story evaluator may be triggered to evaluate certain story angles at a pre-set date and time (e.g. at the close of a trading day for a stock market). At step 604 the story evaluator loads an angle to be tested, e.g. from the angle set data structure. For example, the story angle may be "highest percent change for the trading day." At step 630 the story evaluator requests data for a plurality of subjects, e.g. from subject data database 404 or subject selector 400. For example, the requested data may comprise stock price data for a particular stock market, index, or sector. At steps 602-610 the story evaluator processes the source data in a similar fashion as described with respect to FIGS. 6(*a*)-6(*f*), except that it processes data for a plurality of subjects. At step 612, the story evaluator tests each subject data model against the applicability conditions for the angle. At step 632 the story evaluator identifies one or more subjects that satisfy the conditions for the angle. For example, this may comprise identifying the stock with the highest intra-day percent price change. At step 614, the story evaluator generates a story generation request for the one or more subjects that satisfied the criteria.

Figure 6A:
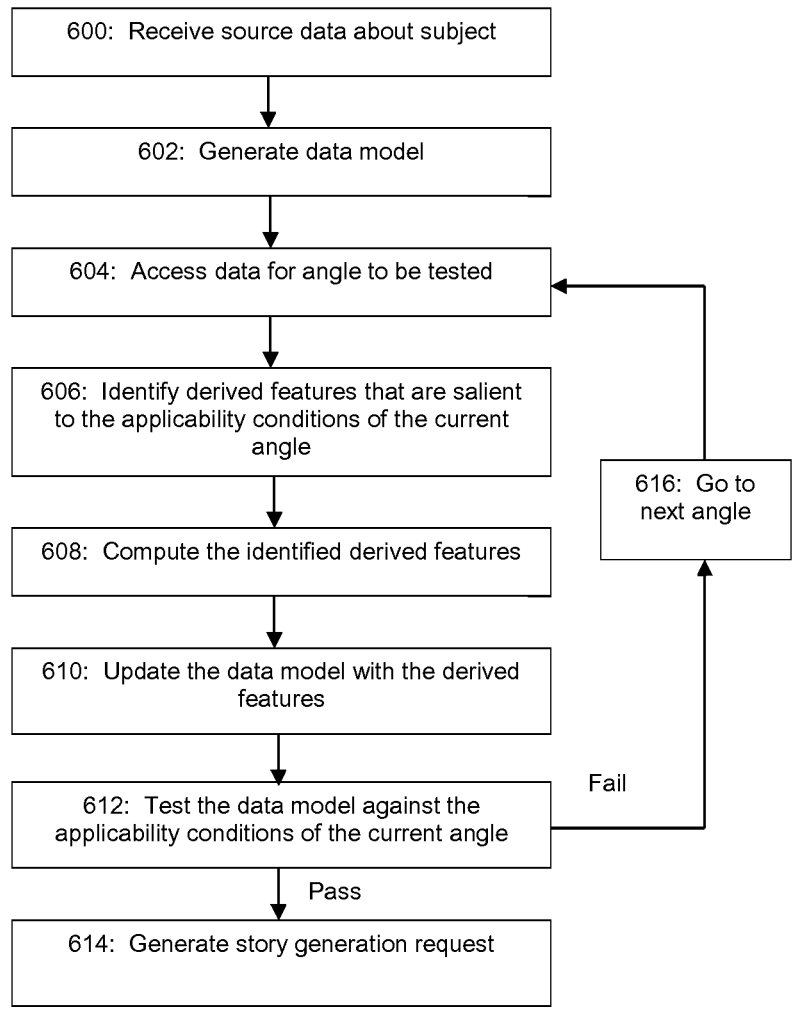
FIGS. 6(a)-6(i) depict various process flows relating to story evaluation according to various exemplary embodiments.
Figure 6B:
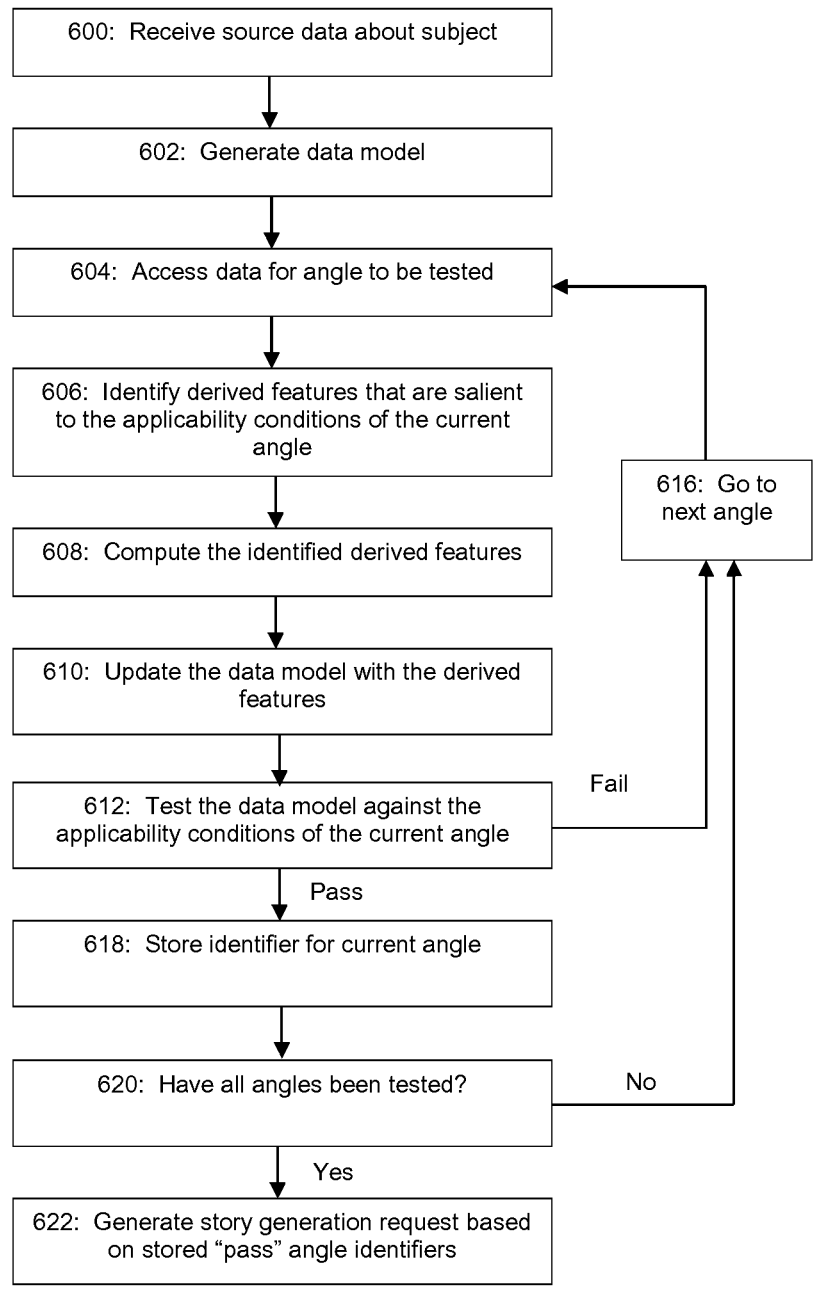
Figure 6C:
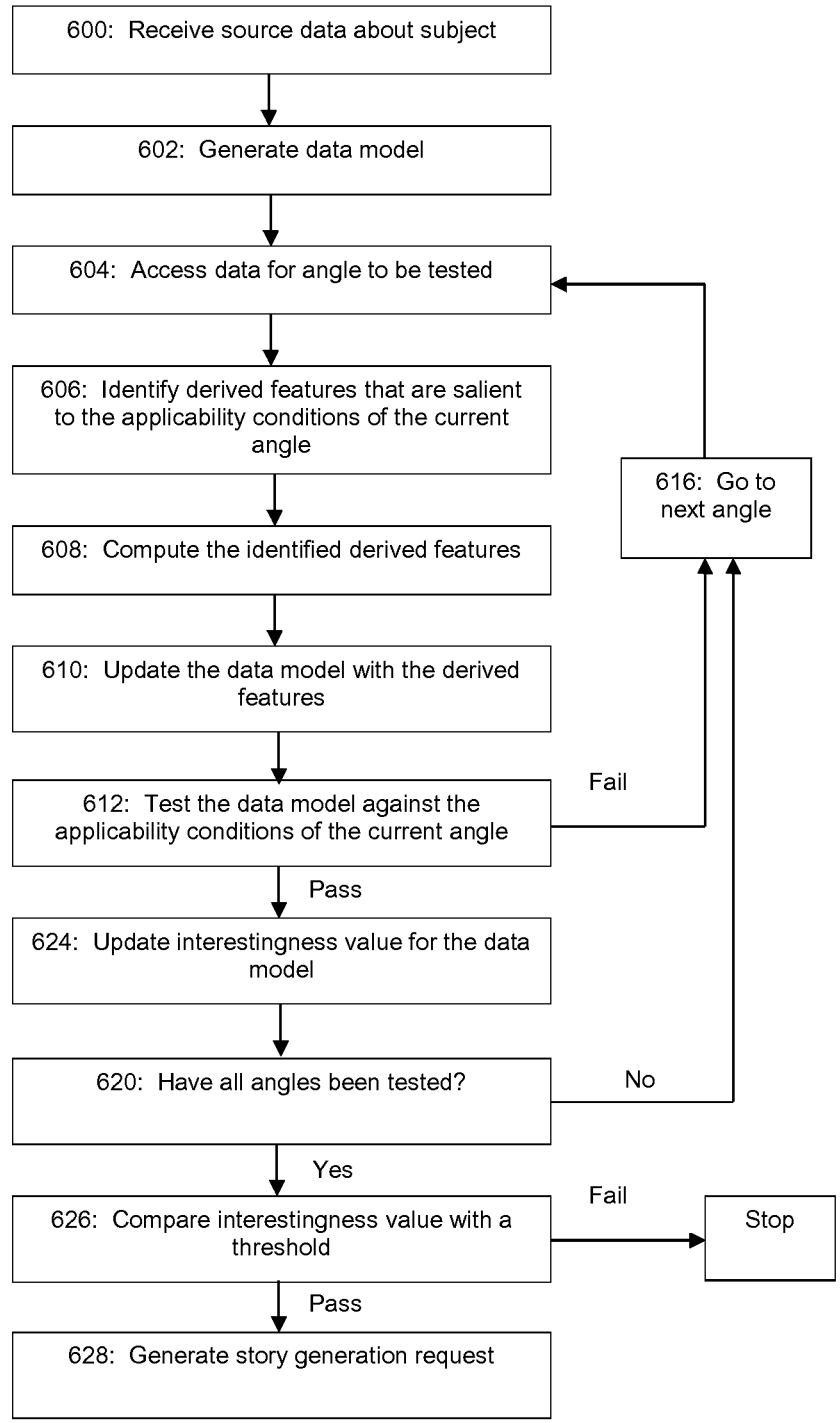
Figure 6D:
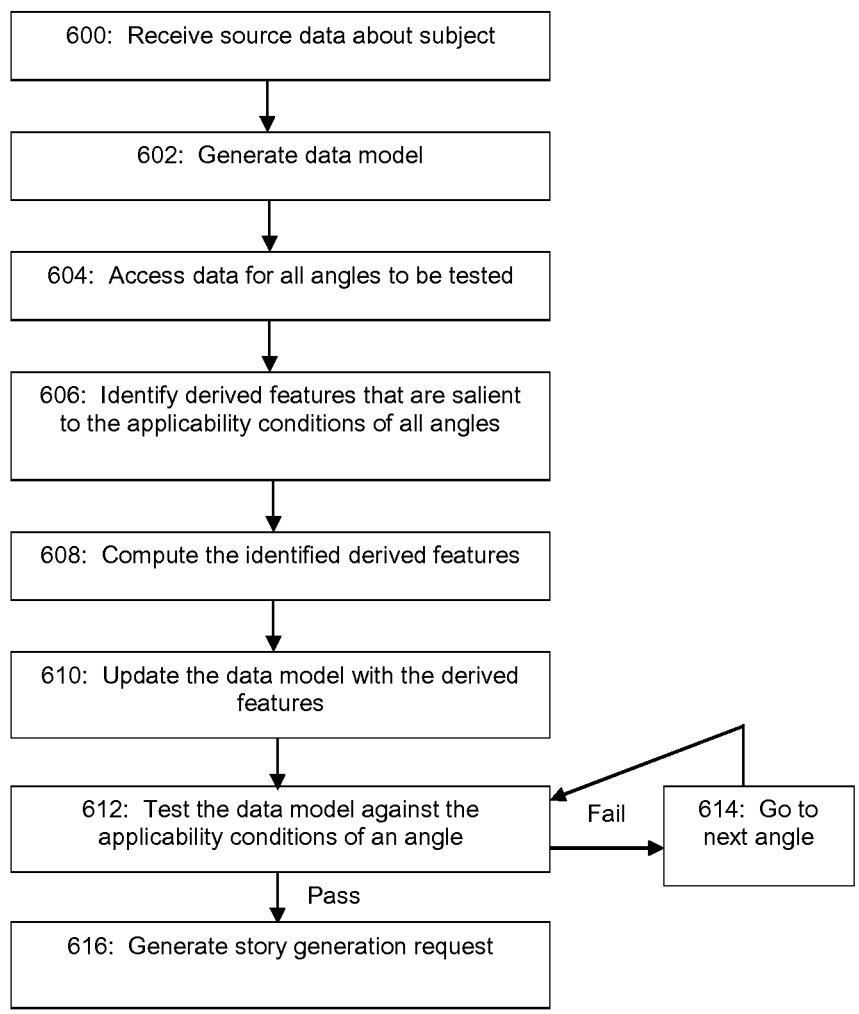
Figure 6E:
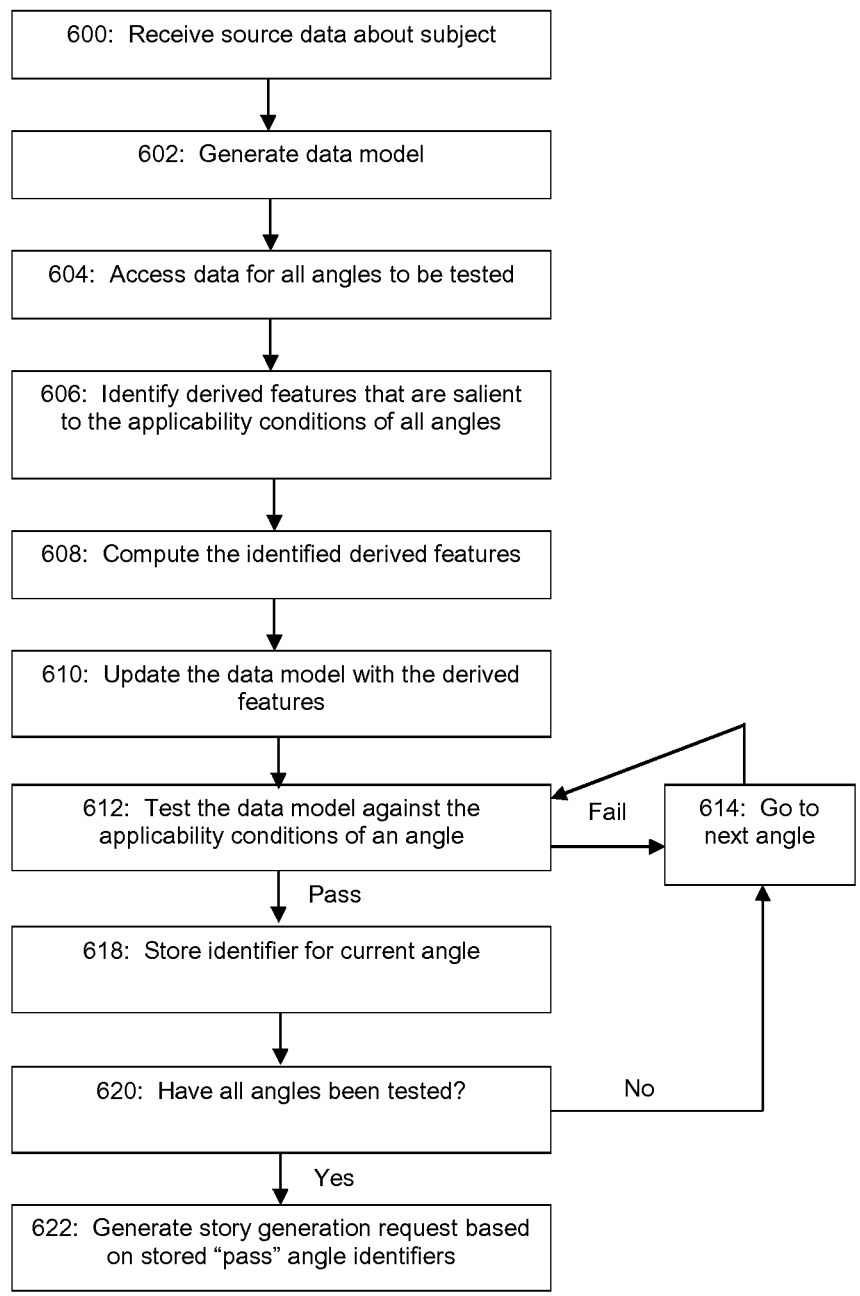
Figure 6F:
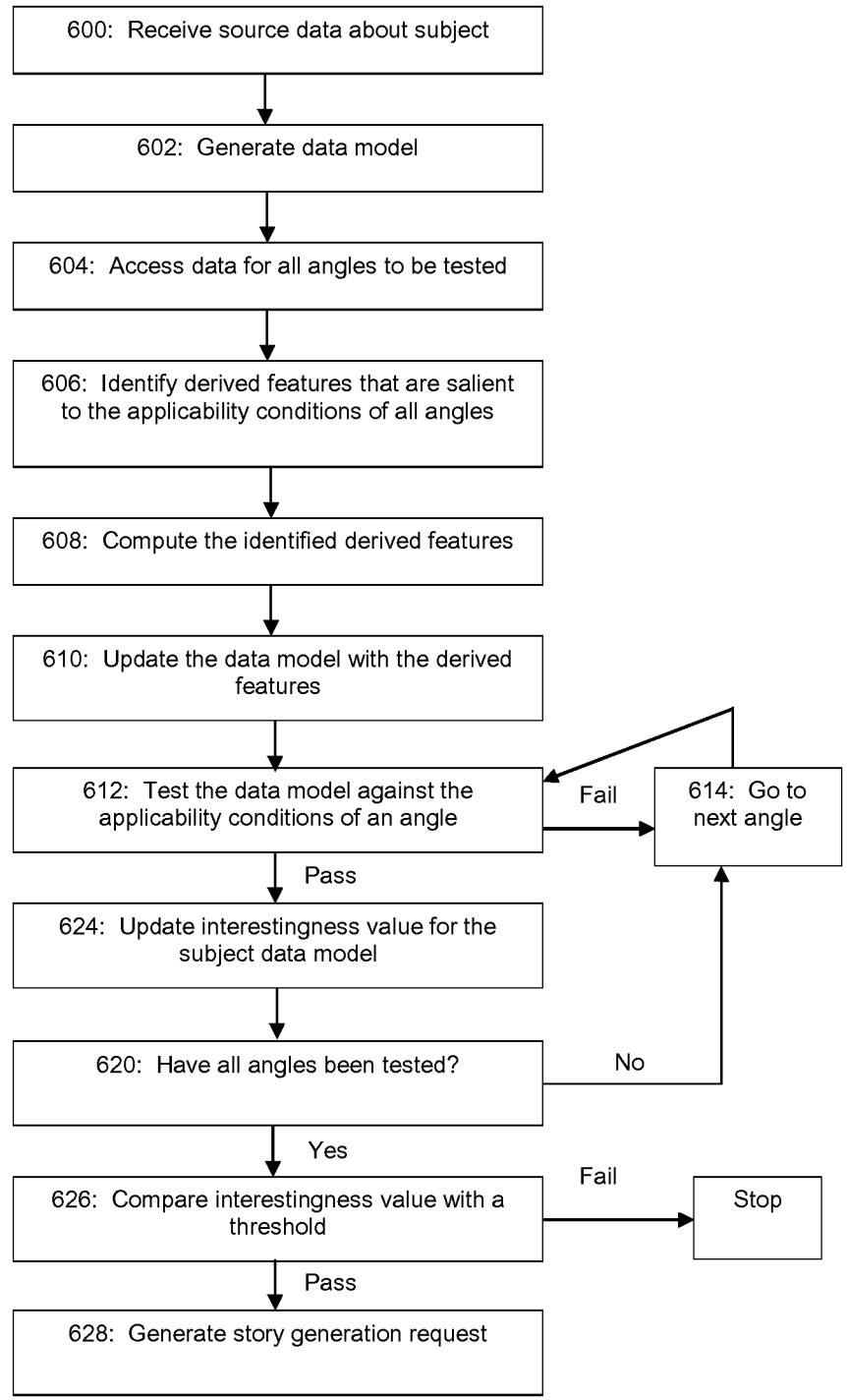
Figure 6G:
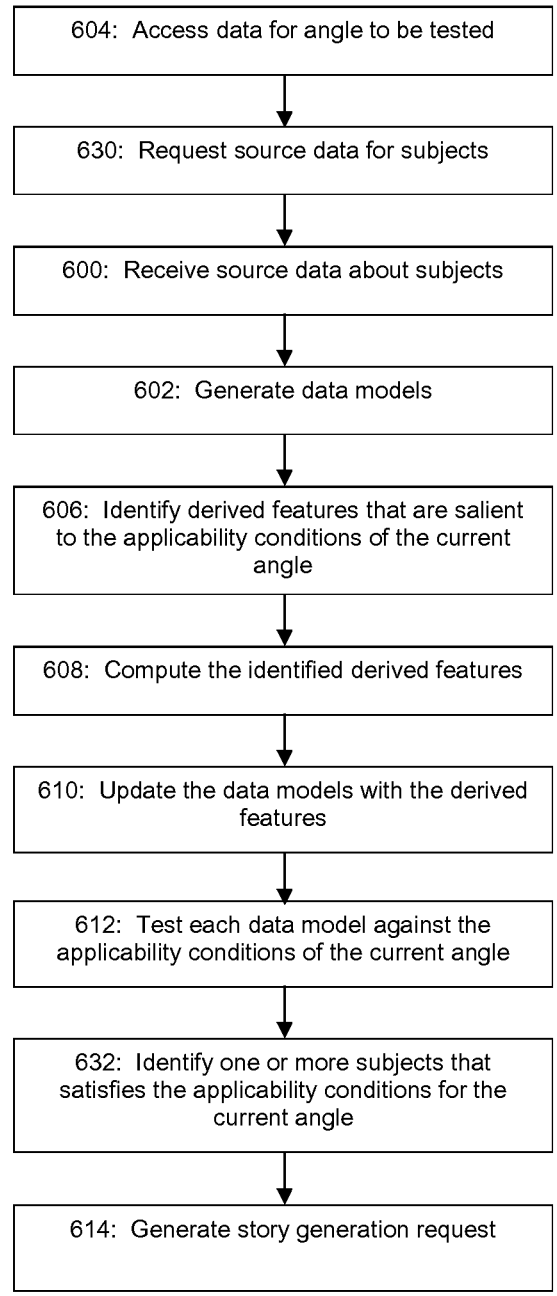
Figure 6H:
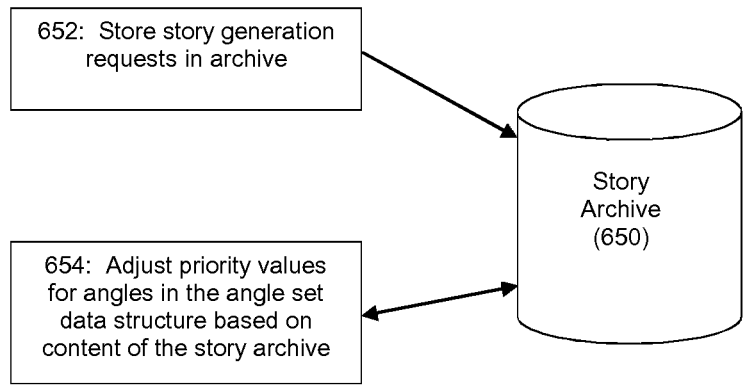

FIGS. 6(h) and (i) depict how a story archive can be used to influence the story evaluation process. In certain situations, the fact that a number of similar stories have recently been generated may detract from the desirability of generating yet another story about the similar topic. It should also be noted that the existence of a number of similar stories over a recent time period may itself be a story worth telling, in which case the existence of such similar stories in the archive 650 can be tested as a trigger to create a story generation request about that circumstance.

At steps 652 of FIGS. 6(h) and (i), story generation requests (or portions thereof) are stored in a story archive 650. Optionally, step 652 may involve the story generator also or alternatively storing generated narrative stories (or portions thereof) in the archive 650, storing data indicative of story angles found to be applicable to previously processed data in the archive 650, or the like. In the example of FIG. 6(n), step 652 can be implemented by, whenever the story evaluator generates a story generation request (e.g., at steps 616, 622, or 628) it stores the story generation request (or some portion thereof) in story archive 650 for later use. In an exemplary embodiment, the data stored in the story archive 650 is a subset of the data comprising a story generation request 300. The data in the story archive 650 may be purged at predetermined times. For example, data may be purged based on the age of the data item, e.g., when the data is 48 hours old.

With respect to FIG. 6(h), at step 654, the story evaluator uses the data in the story archive 650 to modify the importance values for associated angles in the angle set data structure 204. For example, the story evaluator may reduce the importance value for an angle and/or subject that has been used to generate multiple stories over a certain temporal period (e.g., in the past 48 hours). For example, the importance value may be reduced to 0.

For example, if a given stock market or index or sector is generally trending upward, then the story evaluator may reduce the importance values for angles related to stock price increases for that stock market. For example, if the DJIA is up 5% for the day, then the story evaluator may reduce the importance value for an angle related to intra-day price increase for individual stocks. Similarly, the story evaluator may be configured to increase the importance values for angles related to stock price decreases. Because if the market generally is going up, and a particular stock is going down, that may be more interesting than if the stock is following the market, index, or sector. This may also be implemented by adjusting the thresholds used by the story evaluation process (e.g., the thresholds used by the applicability conditions for certain angles, the thresholds used for evaluating interestingness, etc.). For example, if the stock market is generally trending upward, then the story evaluator may raise certain thresholds for angles related to stock price increases for that stock market (e.g., if the NASDAQ is up 10% for the day, then the story evaluator may increase the threshold for the "Gapping Up" story angle by 10%).

Figure 6I:
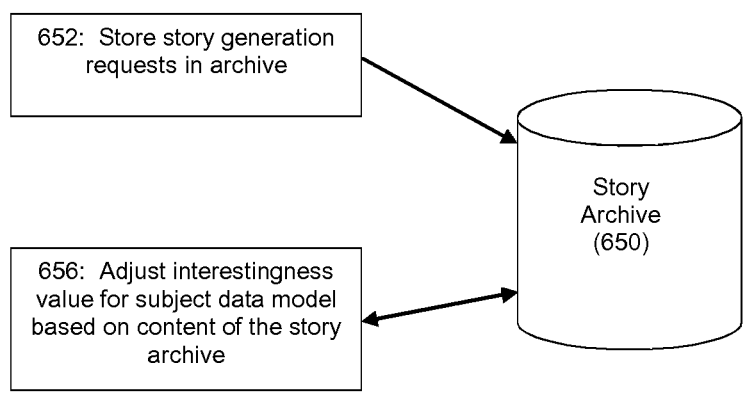

With reference to FIG. 6(i), at step 656 the content of archive 650 can be used to modify the interestingness value(s) for a data model. For example, the story evaluator may be configured to reduce the interestingness value for a potential subject that has previously been the subject of a story generation request in the past 48 hours. As another example, the story evaluator may be configured to reduce the interestingness value for potential subjects that are related to other subjects that have previously been the subject of a story generation request. Subject relations may be stored in the subject data database 404. As indicative above, the story evaluator may also be configured to modify an interestingness threshold (e.g., instead of modifying the interestingness of particular angles or subjects) in response to data in the story archive 650.

The story evaluator may also be configured to perform more sophisticated use of story archive 650. For example, certain stories in the story archive 650 may comprise predictions about future events. A "prediction refutation" story angle could then be added to the angle data set data structure whose applicability conditions incorporate predictions that are found in the story archive 650. Also, a "prediction confirmation" story could similarly be incorporated into the angle set data structure. The story evaluator may be configured to increase the interestingness score for angles that confirm or refute such a prediction in an earlier story.

Figure 7A:
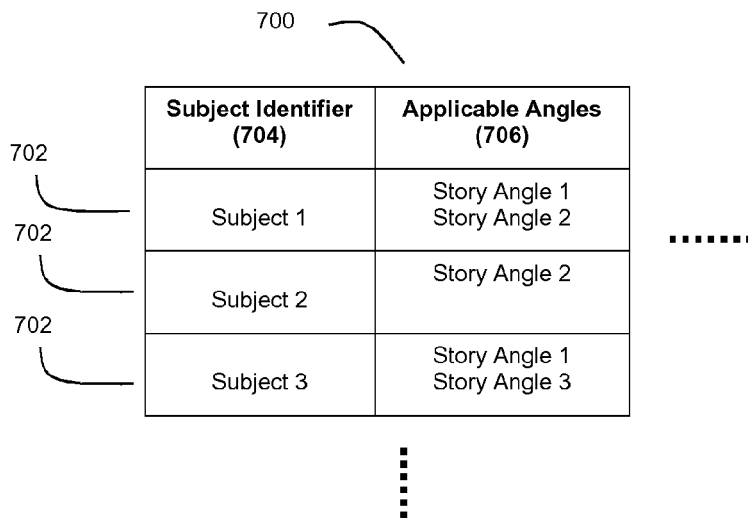
Figure 7B:
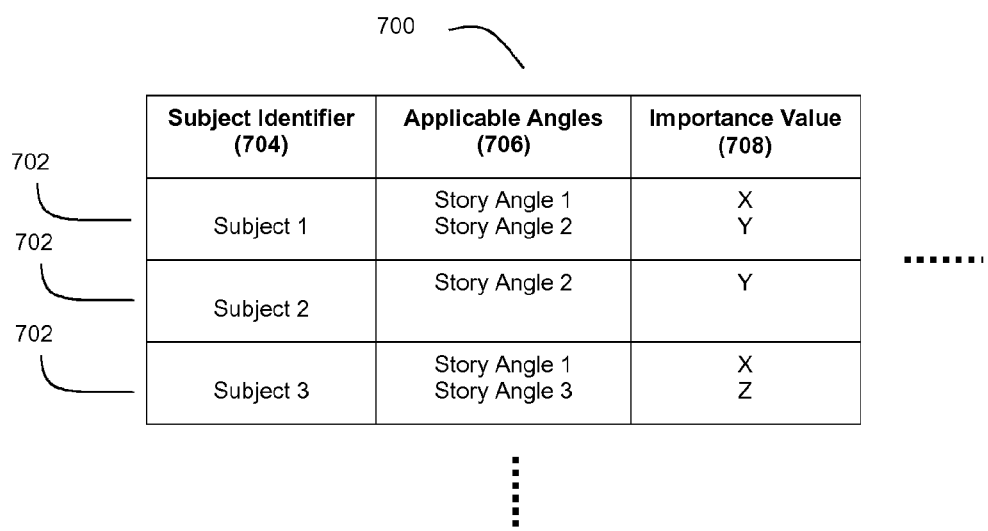

A story generation request 300 may comprise a variety of optional data features. FIG. 7(a) depicts an exemplary data structure 700 for implementing story generation queue 302. Story generation queue data structure 700 comprises a plurality of data structures 702, each representative of a story generation request 300. Each story generation request data structure 702 comprises a corresponding subject identifier 704, such as a stock ticker symbol (e.g. "MSFT"). Each story generation request data structure 702 further comprises identifiers for one or more applicable angles 706. FIG. 7(b) depicts another exemplary data structure 700 wherein each story generation request further comprises an importance value 708 associated with each applicable angle for each subject. FIG. 7(c) depicts yet another exemplary data structure 700 wherein each story generation request further comprises an interestingness value 710 associated with each subject. In an exemplary embodiment, the story generator 304 may be configured to select story generation requests from the story generation queue 302 based on the highest interestingness value (rather than a simple FIFO scheme).

Furthermore, the story evaluator may further compute a priority value for inclusion in the story generation requests, where these priority values are indicative of a relative priority between story generation requests. Such priority values can be computed as a function of angle importance, data model interestingness and other features if desired. The story generator in turn can leverage these priority values to influence placement decisions for generated narrative stories. For example, high priority values could result in a highly visible story placement (e.g., "top of the fold"-type or "large font"-type placement).

Story generation request 300 may further include additional data such as subject data and subject data models created by the story evaluator 202. Because data in the story generation request is passed to the story generator 304, the story generator 304 need not re-compute data found in the story generation request. Thus, when the story evaluator is configured to include more data in the story generation request, the computational efficiency of the system is generally increased. This efficiency improvement may come at the price of added program complexity.

Including more data in the story generation request increases the complexity of the system. For example, the story evaluator must be configured to store certain data in the story generation request, and the story generator must be configured to make use of that data. A practitioner can make a decision as to how much data to include in story generation requests based on a balancing between this additional system complexity and the level of efficiency desired or required.

If large amounts of data are involved then bandwidth may also be a consideration. Including more data in the story generation request also increases the bandwidth needed between the story evaluator 202 and the story generator 304.

Thus, in systems where the story evaluator 202 and story generator 304 are located on geographically remote systems, it may be desirable to reduce the size of the story generation request. A practitioner can make a decision as to how much data should be included in the story generation requests based on the network performance (e.g. bandwidth and latency) available in the communications link between the story evaluator 202 and story generator 304, as well as the processing power available to the story generator 304. Additional processing power will tend to mitigate the negative effects of requiring the story generator 304 to perform additional calculations. For example, in an embodiment wherein network performance is poor and processing power available to the story generator 304 is relatively inexpensive, it may be preferable to include very little data in the story generation requests (e.g., only a subject identifier). The location of subject data database 404 may also be a consideration. If network performance (e.g. bandwidth and latency) between story generator 304 and subject data database 404 is poor, but network performance between story evaluator 202 and subject data database 404 is good, then it may be preferable to increase the amount of data included in the story generator requests.

It should be apparent that the system may execute the story evaluator at multiple points in time, or continuously over a span of time. It should be noted that the story evaluator may be configured to store calculation products in a variety of ways. For example, derived features may be stored in a data model relating to a subject, and the subject data model may be stored in system memory, or in a database such as database 404. Other calculation products that may be stored for later use include applicability conditions for angles.

In an exemplary embodiment, the various steps of the process may be performed by a single software application. For example, story evaluator 202 and story generator 304 may be modules in a single application. In another exemplary embodiment, story evaluator 202 and story generator 304 are separate software applications. The separation of the various modules into distinct applications presents opportunities for pipelining the process, as described in detail below.

Figure 8A:
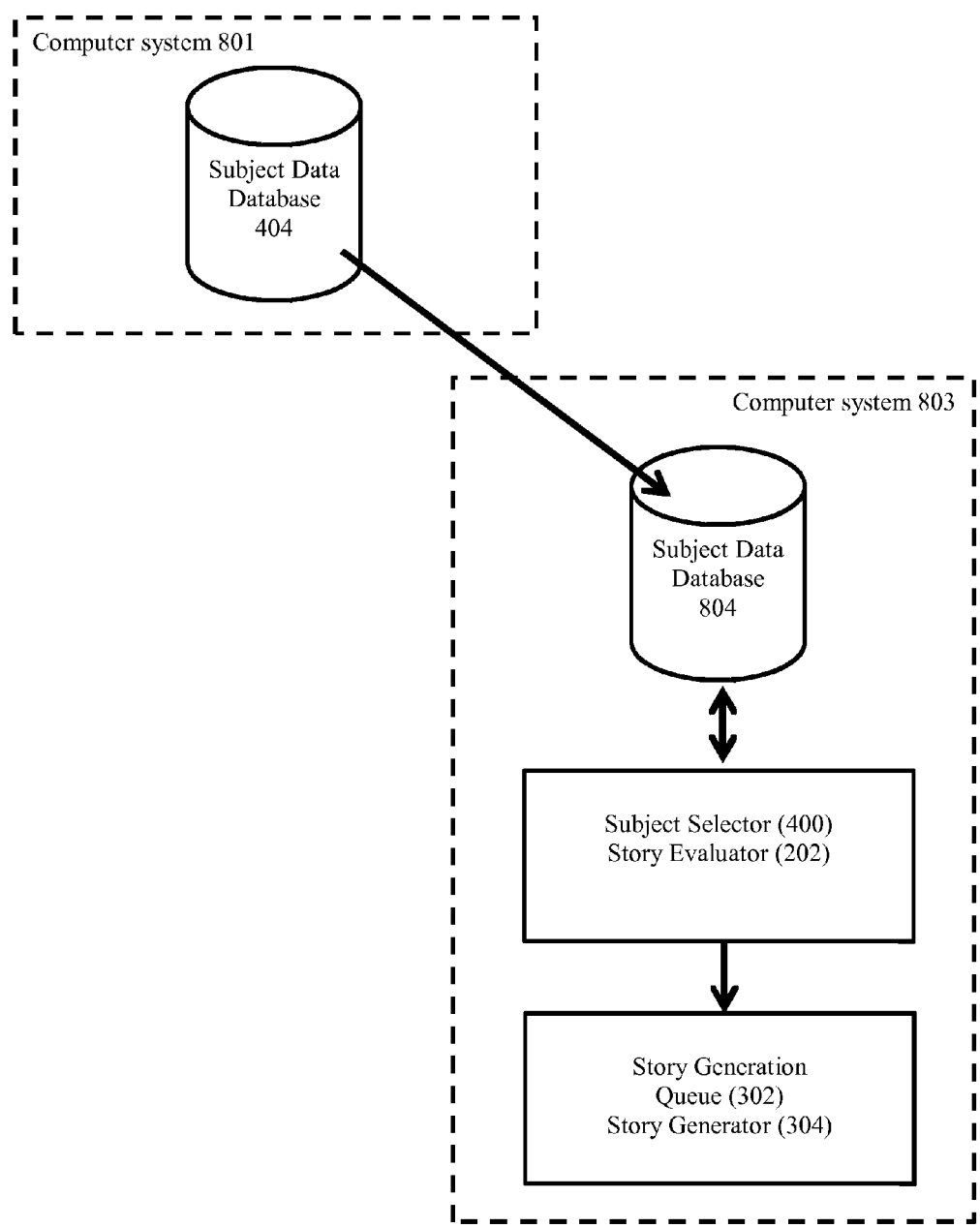
FIGS. 8(a)-8(c) depict system configurations according to various exemplary embodiments.

FIG. 8(a) depicts an exemplary system configuration according to an exemplary embodiment comprising a first computer system 801 and a second computer system 803. For example, computer system 801 may be a client computer system, and computer system 803 may be a narrative generation service provider computer system, and the two may be connected by a network connection such as the internet. First computer system 801 comprises subject data database 404. Subject data database 404 is replicated in subject data database 804 on computer system 803, using replication techniques known in the art. A first software application executed by computer system 803 comprises the story evaluator 202 (and optionally, subject selector 400). A second software application executed by computer system 803 comprises story generation queue 302 and story generator 304. In this embodiment, network performance between the two applications is likely very good (for example, the two applications may be executed by the same processor), so a practitioner may desire to include a high level of data in story generation requests as discussed above.

Figure 8B:
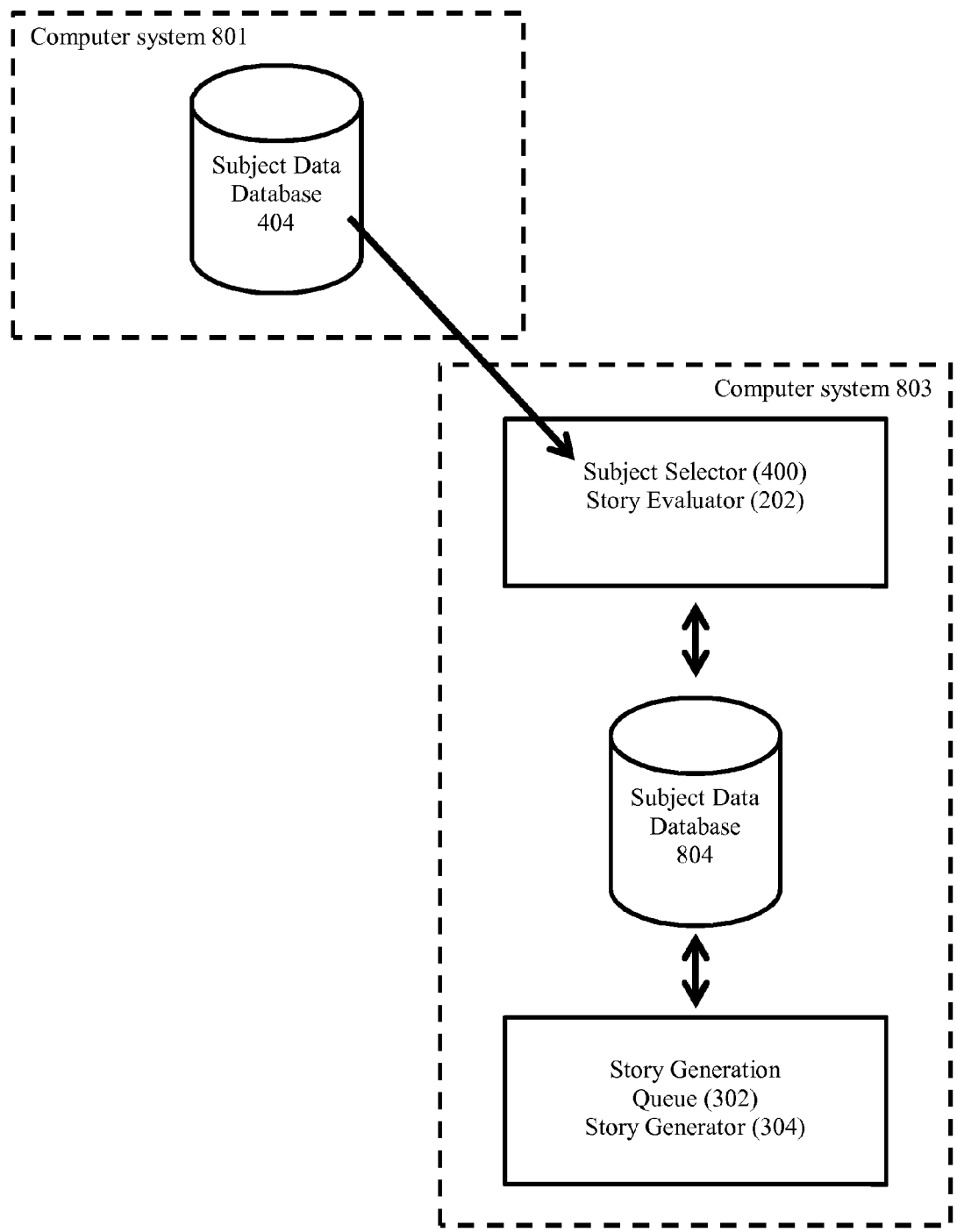

FIG. 8(b) depicts another exemplary system configuration according to an exemplary embodiment comprising a first computer system 801 and a second computer system 803. This embodiment is similar to the embodiment of FIG. 8(a), except that in this embodiment, the story evaluator application (and optionally, subject selector 400) receives incoming data from computer system 801 and processes the data on its way to subject data database 804. This design reduces latency between the incoming data and the story evaluator.

Figure 8C:
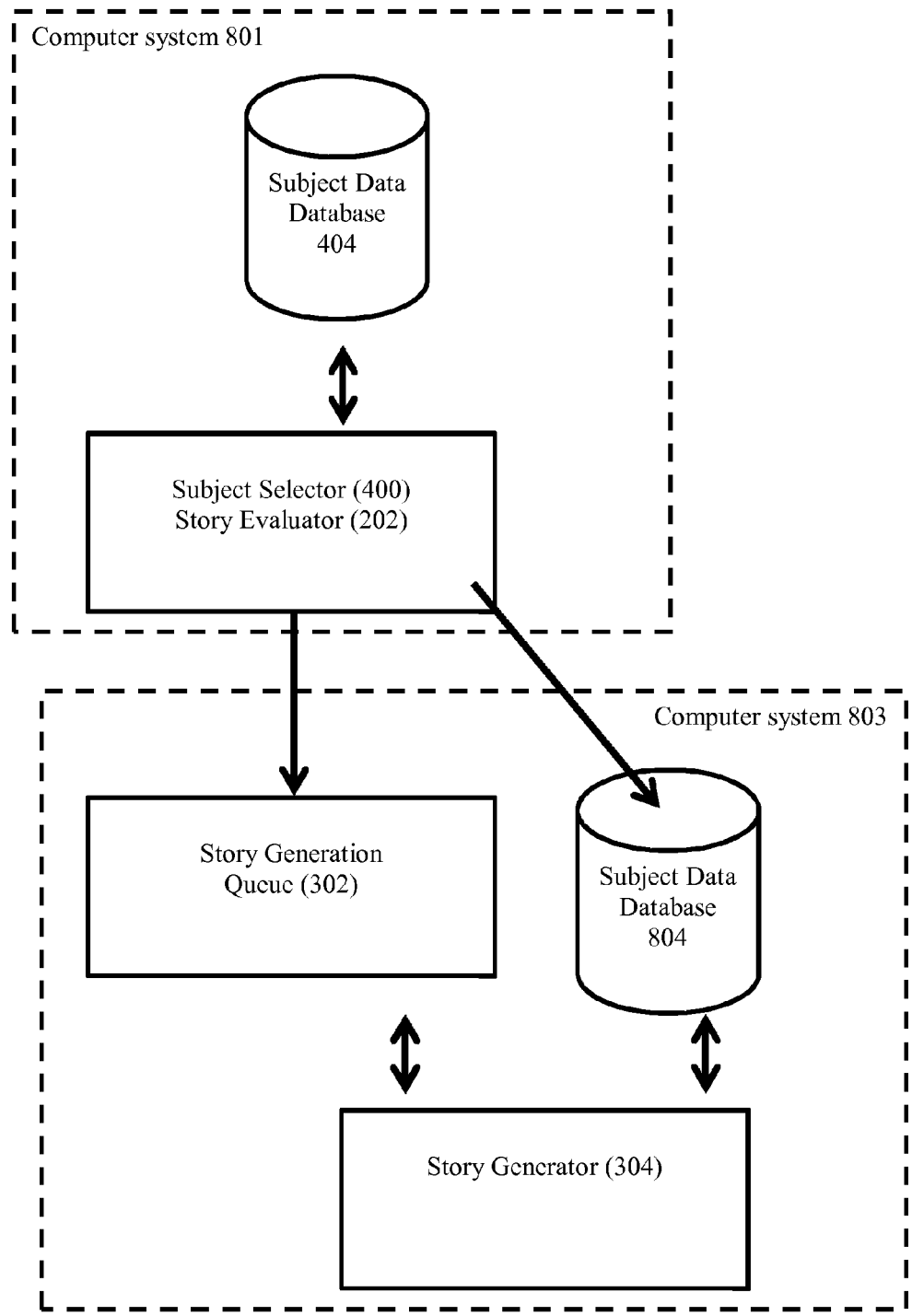

FIG. 8(c) depicts yet another exemplary system configuration according to an exemplary embodiment comprising a first computer system 801 and a second computer system 803. In this embodiment, first computer system 801 executes a software application comprising story evaluator 202 (and optionally, subject selector 400). The story evaluator sends story generation requests via the communication link (e.g. internet) to story generation queue 302 on computer system 803. In this embodiment, latency between the subject data database 404 and the story evaluator application is greatly reduced. In this embodiment, it may be desirable to only include a relatively small amount of data in the story generation requests (e.g., only a subject identifier), as they will have to traverse the communication link. So long as processing power on computer system 803 is sufficient, this embodiment should reduce overall system latency, despite the need for story generator application 304 to perform computation of derived features, subject data models, and angle applicability.

In another exemplary embodiment, the applicability conditions (or portions thereof) of the angles utilized by the story evaluator application can be pre-compiled into database triggers and inserted into subject data database 404. Thus when data relevant to these triggers is added to subject data database 404, the database trigger can add the subject to a queue for further analysis by story evaluator 202; or if the angle conditions are completely specified in the database trigger, can directly produce a story generation request to be sent to the story generator 304.

In another exemplary embodiment, angle applicability conditions can be compiled into tests that run on the data while it is in memory (e.g. system memory or network interface memory) during data transfer from a source to a destination (e.g., within the data transfer layer), to the story evaluator and/or generator or between two other (e.g. unrelated) systems. In such embodiments, these tests may be configured to add subjects to a subject queue or produce story generation request directly.

Figure 9A:
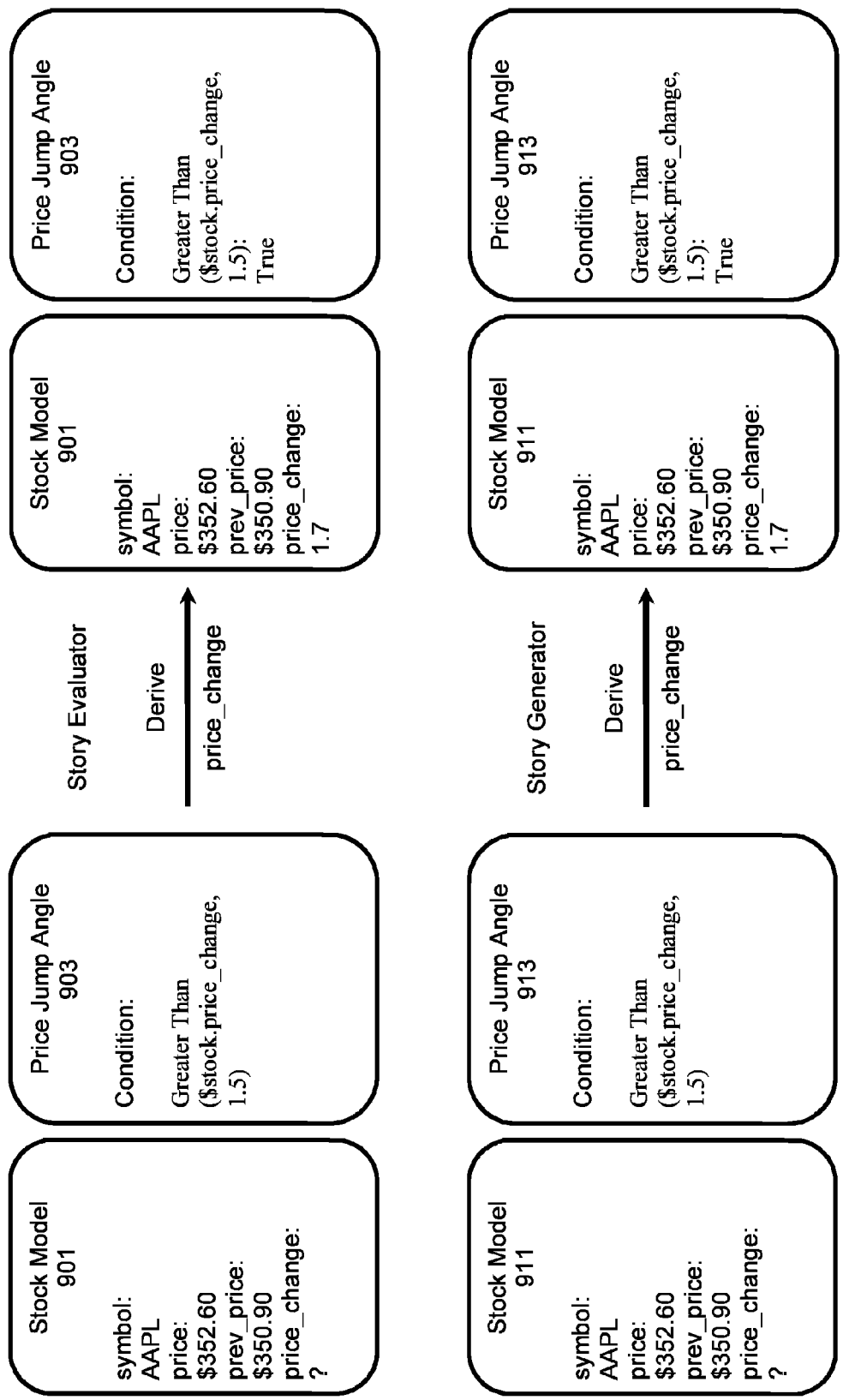
FIGS. 9(a) and (b) depict an exemplary evaluation of stock price information.

Stock Price Story Evaluation Examples:

FIG. 9(a) depicts an exemplary embodiment where a data model having stock price information for a company is processed by a story evaluator and then a story generator. In the embodiment of FIG. 9(a), the story evaluator is not configured to pass intermediate data to the story generator. The story evaluator loads data (e.g. at step 600) (e.g. raw data from database 404) for AAPL (Apple Corporation) and creates (e.g. at step 602) stock model 901. FIG. 9(a) depicts exemplary data fields and values that can be included in such a data model. The story evaluator also loads (e.g. at step 604) a "Price jump" angle 903 (e.g. from angle set data structure 204) that includes the applicability condition shown in FIG. 9(a). The story evaluator computes (e.g. at step 608) the derived feature "price_change" because it is necessary to the condition for the price jump angle, the "price_change" being calculated as 1.7. The story evaluator then updates (e.g. at step 610) the stock model 901 with the "price_change", tests the condition for the "Price jump" angle against the "price_change", and finding the condition to be satisfied, updates the price jump angle 903 with an indication that it is applicable. (The story evaluator may also be configured to add the "Price jump" angle to a list of applicable angles). In this embodiment, the story evaluator creates a story generation request, but does not pass intermediate data to the story generator (e.g. the story generation request merely comprises a subject identifier for AAPL; it does not include the derived price change feature). Thus, the story generator must compute the "price_change" derived feature, and test the angle conditions for "Price jump."

Figure 9B:
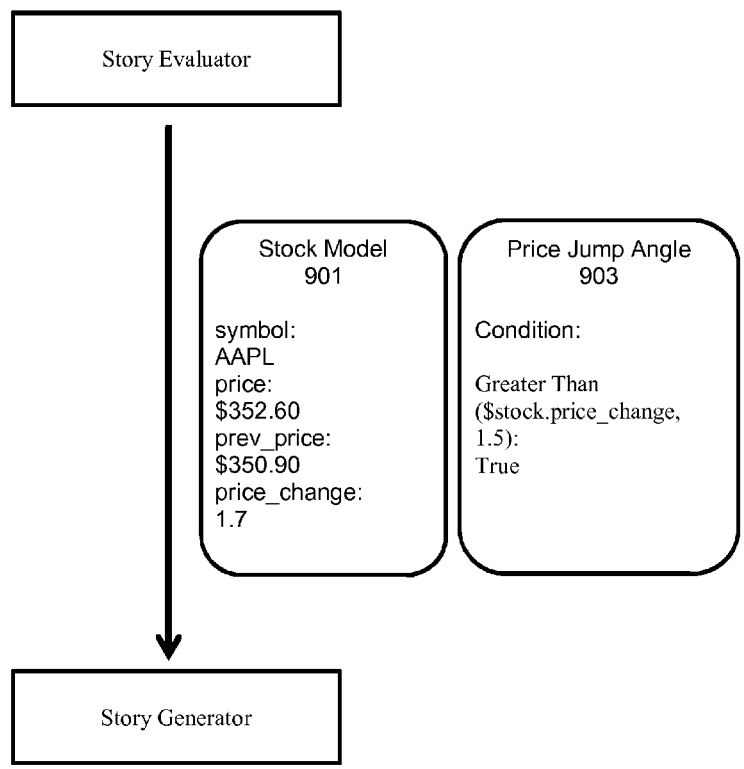

FIG. 9(b) an exemplary embodiment wherein the story evaluator is configured to pass additional data to the story generator. With this example, after computing the "price_change" derived feature and updating the stock model, the story evaluator passes the updated stock model to the story generator. For example, the story evaluator may create story generation request comprising data indicative of the updated stock model (e.g., the updated stock model itself, a pointer to the updated stock model in memory, or a pointer to a database record comprising the updated stock model, etc.) It should also be noted that the story evaluator can be configured to communicate the derived feature(s) used in derived feature. The system may also load data from the database in an "as-needed" fashion such that only data necessary to test the applicability conditions for designated triggering angles is loaded into memory. If one or more triggering angles apply, then a story generation request will be created and placed in the queue. If multiple triggering angles apply, then multiple stories may be generated. Alternatively, a single story may be generated comprising multiple angles.

The exemplary system stores a list of stock ticker symbols: "ticker_symbols":["IBM", "GOOG", "MSFT", . . . , "AAPL"]

In the subject selection process (e.g., subject selector 400), the system loads the data for a specific symbol. The data for Apple, for example, might look something like this:

```
{
  "ticker symbol": "AAPL",
  "company_name": "Apple Inc.",
  "current_price": "352.60",
  "opening_price": "346.95",
  "fifty_two_week_high": "348.9", # Always 52 week high at last close of day
    . . .
  "daily_volume":"7530000"
}
The exemplary system stores a list of triggering angles as follows:
["52WeekHigh", "52WeekLow", "RatingsUpgrade", . . . , "GappingUp"]
The following angle specification defines the "52WeekHigh" angle in the exemplary
embodiment:
---
name: 52WeekHigh(stock:Stock) < NormalAngle
  test:
    'And(
      $stock.52_week_high, # Is the stock experiencing a 52 week high?
      $stock.popularity_cut, # Does it pass our popularity test?
      LessThan(Abs($stock.today.percent_change),75), # Sanity check/Data cleanup
      LessThan(Abs($stock.percent_above_one_year_high),75), # Sanity check/Data cleanup
      $stock.proper_exchange, # Only want stocks in NYSE, NASDAQ, etc. not OTC
      $stock.is_weekday, # Today is a weekday
      $stock.is_data_today, # Data is from today. Sanity checking/data cleaning
      $stock.is_data_during_market_hours, # Data not from midnight, etc. Sanity checking
      $stock.rating_date_not_today, # Implementation detail with getting rating data on Sunday
      $stock.ratings.stock_stats.current_rating, # Has a Street rating, customer preference
      $stock.bullish_rating, # Only talk about stocks they like
      $stock.today.date, # Date defined/exists
      $stock.today.high, # High defined/exists
      $stock.today.current_price, # Price defined/exists
      And
        Or( # Never written story about this company, or not written one today
          IsUndefined($env.generation_history.last_gen_res),
          GreaterThan($env.generation_history.last_gen_res.days_since,0)
        ),
        Or( # Never written 52 week high story about this company, or not written one in last seven days
          IsUndefined($env.generation_history.last_gen_res_for_this_angle),
          GreaterThan($env.generation_history.last_gen_res_for_this_angle.days_since,7)
        )
      )
    )'
  importance: 2
---
``` testing the applicable angle in the story generation request rather than the full updated stock model.

Continuing with a stock price story evaluation example, an exemplary system will now be described in detail. The system stores a list of stocks of interest, and periodically loops through the list of stocks every four minutes. For each stock in the list, the story evaluator retrieves the relevant data about that stock from a database, and builds a structured data element (e.g., derived features) for that stock. The model construction is performed according to as-needed evaluation rules, such that derived features won't be computed unless the applicability conditions for a triggering angle require that In this example, checking the applicability conditions of the 52WeekHigh angle against the data associated with AAPL results in determining that all of the conditions hold true. The first condition ("$stock.52_week_high") actually checks whether the stock has achieved a 52-week high. More specifically, this condition checks whether a raw datum, the current stock price of the stock, exceeds the threshold provided by a derived feature, the current 52-week high of the stock. The subsequent conditions determine, for example, whether the stock is popular enough to be worth a story ("$stock.popularity_cut") (a determination that is supplied by the user in this instance), apply various "sanity checks" to the data, etc. Towards the end of the conditions is a disjunction that represents the check as to whether a story has been written about this too recently, based on historical story data as contained in story archive 650.

If the angle's conditions are satisfied, the angle's importance is evaluated. In this example, the importance of the 52WeekHigh angle is a constant value of 2. This is greater than the importance threshold for requesting a story, set at 1 in this example. Thus, a story generation request is created as follows, the request comprising the ticker symbol of the stock (in this case AAPL) as well as the name of the story type to be generated (52_week_high): gen_req=engine.ContentGenerationRequest(ticker_symbol, '52_week_high')
This request is then inserted into the story generation request queue: queue.add_item(gen_req)

While various concepts have been described in detail, it will be appreciated by those skilled in the art that various modifications and alternatives to those concepts could be developed in light of the overall teachings of the disclosure. For example, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will be additionally appreciated that the particular concepts disclosed herein are meant to be illustrative only and not limiting as to the scope of the invention which is to be given the full breadth of the appended claims and any equivalents thereof.

What is claimed is:

1. A story evaluation apparatus comprising:
a memory for storing an angle set data structure, the angle set data structure comprising (1) data representative of at least one story angle and (2) data associated with the at least one story angle that is representative of at least one applicability condition for the associated at least one story angle; and
a processor configured to (1) process data against the angle set data structure to determine whether at least one applicability condition for at least one story angle has been satisfied by the processed data, and (2) in response to the processing operation, generate an evaluation indicator, the evaluation indicator being indicative of whether a narrative story relating to the processed data is to be generated.

2. The apparatus of claim 1 wherein the processor is further configured to automatically generate a narrative story relating to the processed data in response to the evaluation indicator indicating that a narrative story relating to the processed data is to be generated.

3. The apparatus of claim 1 wherein the processor is further configured to (1) receive source data relating to a subject, (2) compute a plurality of derived features based at least in part on the received source data, wherein the data processed by the processing operation comprises the source data and the derived features, and (3) generate an evaluation indicator indicative of whether a narrative story relating to the processed data that incorporates a story angle of the angle set data structure whose applicability conditions were satisfied by the processed data is to be generated.

4. The apparatus of claim 3 wherein the processor is further configured to (1) analyze the received source data, and (2) determine the subject related to the received source data in response to the analysis of the source data.

5. The apparatus of claim 4 wherein the processor is further configured to (1) analyze the derived features, and (2) determine the subject related to the received source data in response to the analysis of the source data and the derived features.

6. The apparatus of claim 3 wherein the evaluation indicator comprises a story generation request, the story generation request indicating that the narrative story is to be generated.

7. The apparatus of claim 6 wherein the story generation request comprises data that is indicative of at least one story angle from the angle set data structure.

8. The apparatus of claim 7 wherein the story generation request further comprises data indicative of at least one member of the group consisting of (1) the subject, and (2) at least a portion of the processed data.

9. The apparatus of claim 7 wherein the processor is further configured to (1) generate and update a data model relating to the subject based at least in part on the source data and the derived features, and (2) process the data model against the angle set data structure to determine whether at least one applicability condition for at least one angle has been satisfied by the data model.

10. The apparatus of claim 9 wherein the story generation request further comprises at least one derived feature from the data model.

11. The apparatus of claim 9 wherein the story generation request further comprises the data model.

12. The apparatus of claim 3 wherein the processor is further configured to (1) store the received source data in a database, (2) access a subject queue, the subject queue comprising a plurality of subject identifiers, (3) read a subject identifier from the subject queue in response to the subject queue accessing operation; (4) retrieve source data relating to the subject corresponding to the read subject identifier from the database in response to a database query associated with the read subject identifier, and (5) perform the derived features computation operation and the processing operation on the retrieved source data.

13. The apparatus of claim 3 wherein the processor is further configured to perform the receiving operation, the derived features computation operation, and the processing operation while the source data is in transit between a source and a destination.

14. The apparatus of claim 13 wherein the processor comprises a data transfer layer, the processor being configured to perform the receiving operation, the derived features computation operation, and the processing operation within the data transfer layer.

15. The apparatus of claim 3 wherein the angle set data structure further comprises data for a plurality of story angles, the story angle data comprising, for each story angle (1) an identifier for that story angle, and (2) data representative of at least one applicability condition for that story angle.

16. The apparatus of claim 15 wherein the processor is further configured to (1) compile at least a portion of the story angle data into a plurality of database triggers, and (2) perform the processing operation using the database triggers.

17. The apparatus of claim 16 wherein the processor is further configured to (1) receive the source data from a remote data source, (2) store the received source data in a database, and (3) perform the derived features computation operation, the processing operation, and the generation operation prior to the storage operation.

18. The apparatus of claim 15 wherein the processor is further configured to test at least one of the derived features against at least one of the applicability conditions associated with a story angle of the angle set data structure to determine whether at least one applicability condition for at least one story angle has been satisfied by the processed data.

19. The apparatus of claim 15 wherein the story angle data of the angle set data structure further comprises, for each story angle, data representative of an importance value for that story angle.

20. The apparatus of claim 19 wherein the processor is further configured to (1) compute an interestingness value for the processed data based at least in part on the importance value of each story angle whose associated applicability conditions were satisfied by the processed data, and (2) generate the evaluation indicator based at least in part on the computed interestingness value.

21. The apparatus of claim 20 wherein the processor is further configured to generate a story generation request in response to the interestingness value exceeding a threshold, the story generation request indicating that the narrative story is to be generated.

22. The apparatus of claim 19 wherein the processor is further configured to (1) create an archive of data, the data being indicative of at least one member of the group consisting of a plurality of previously generated evaluation indicators, a plurality of previously generated story generation requests, a plurality of story angles previously found to be applicable to previously evaluated data, and a plurality of previously generated narrative stories, (2) adjust the importance value for at least one of the story angles in the angle set data structure based on the content of the archive.

23. The apparatus of claim 15 wherein the processor is further configured to (1) compute an interestingness value based on the source data the derived features and at least one of the applicability conditions, and (2) generate the evaluation indicator based at least in part on the computed interestingness value.

24. The apparatus of claim 23 wherein the evaluation indicator comprises the computed interestingness value.

25. The apparatus of claim 23 wherein the evaluation indicator comprises a story generation request, the story generation request indicating that the narrative story is to be generated, wherein the processor is further configured to compute a priority value for the narrative story based at least in part on the computed interestingness value, and wherein the story generation request comprises the computed priority value.

26. The apparatus of claim 23 wherein the evaluation indicator comprises a story generation request, the story generation request indicating that the narrative story is to be generated, wherein the processor is further configured to (1) create an archive of data, the data being indicative of at least one member of the group consisting of a plurality of previously generated evaluation indicators, a plurality of previously generated story generation requests, a plurality of story angles previously found to be applicable to previously evaluated data, and a plurality of previously generated narrative stories, and (2) use the archive to compute the interestingness value.

27. The apparatus of claim 26 wherein the processor is further configured to (1) reduce the interestingness value in response to the archive containing data about the subject.

28. The apparatus of claim 15 wherein the processor is further configured to (1) create an archive of data, the data being indicative of at least one member of the group consisting of a plurality of previously generated evaluation indicators, a plurality of previously generated story generation requests, a plurality of story angles previously found to be applicable to previously evaluated data, and a plurality of previously generated narrative stories, and (2) adjust at least one of the applicability conditions in the angle set data structure based on the content of the archive.

29. The apparatus of claim 15 wherein at least one of the story angles has an associated applicability condition corresponding to a temporal condition.

30. The apparatus of claim 15 wherein at least one of the story angles has an associated applicability condition corresponding to a data type for the source data.

31. The apparatus of claim 3 wherein the processor is further configured to (1) automatically generate a narrative story about the subject using the angle set data structure in response to the evaluation indicator indicating that the narrative story is to be generated, wherein the story angle data of the angle set data structure further comprises, for each story angle, data representative of a trigger status for that story angle, the trigger status being indicative of whether that story angle is to be evaluated during the processing operation, and wherein the processing operation is configured to process the data against the story angle data in the angle data structure having a trigger status indicative of that story angle to be used by the processing operation.

32. The apparatus of claim 3 wherein the evaluation indicator comprises a story generation request, the story generation request indicating that the narrative story is to be generated, and wherein the processor is further configured to (1) store the story generation request in a queue, the queue storing a plurality of story generation requests, (2) read a story generation request from the queue, and (3) automatically generate a narrative story identified by the read story generation request using the angle set data structure, wherein the narrative story includes a narrative incorporating the story angle identified by the read story generation request.

33. The apparatus of claim 3 wherein the processor is further configured to communicate the evaluation indicator to a remote processor.

34. The apparatus of claim 3 wherein the processor comprises a first processor and a second processor;
wherein the first processor is further configured to (1) performing the receiving operation, the derived features computation operation, the processing operation, and the generation operation, and (2) communicate the evaluation indicator to the second processor; and
wherein the second processor is configured to automatically generate a narrative story in response to the communicated evaluation indicator indicating that the narrative story is to be generated.

35. The apparatus of claim 3 wherein the subject comprises a company, wherein the received source data comprises stock price information associated with the company, and wherein the angle set data structure comprises (1) data representative of a plurality of story angles corresponding to a plurality of different stock price story angles, and (2) for each stock price story angle, data associated therewith that identifies at least one applicability condition for that stock price story angle.

36. The apparatus of claim 35 wherein one of the stock price story angles comprises a "52 week high" stock price story angle.

37. The apparatus of claim 35 wherein one of the stock price story angles comprises a "gapping" stock price story angle.

38. The apparatus of claim 35 wherein the processor is further configured to automatically generate a narrative story about the company in response to the evaluation indicator indicating that the narrative story is to be generated, wherein the automatically generated narrative story comprises a narrative incorporating a stock price story angle of the angle set data structure whose applicability conditions were satisfied by the processed data.

39. The apparatus of claim 38 wherein the processor is further configured to use the angle set data structure to facilitate the automatic generation of the narrative story.

40. The apparatus of claim 3 wherein the accessed angle data set structure comprises a plurality of instructions for execution by the processor during the processing operation, the plurality of instructions incorporating the at least one applicability condition for the at least one story angle.

41. An apparatus comprising:
- a memory for storing data about at least one story angle; and
- a processor for interacting with the memory to execute a software program, the software program comprising a story evaluator module, the story evaluator module configured to process data relating to a subject against the story angle data to determine whether a narrative story about the subject is to be automatically generated.

42. The apparatus of claim 41 wherein the memory is configured to store data about a plurality of story angles, and wherein the software program further comprises a story generator module, the story generator module for interacting with the story evaluation module, the story generator module configured to automatically generate a narrative story about a subject in response to a determination by the story evaluator module that a narrative story about the subject is to be automatically generated.

\* \* \* \* \*